United States Patent
Aoki

(10) Patent No.: US 9,407,363 B2
(45) Date of Patent: Aug. 2, 2016

(54) CAPTURING DEVICE, CAPTURING METHOD, AND CAPTURING PROGRAM

(75) Inventor: Kazuhiko Aoki, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/384,121

(22) PCT Filed: Jun. 21, 2010

(86) PCT No.: PCT/JP2010/060929
§ 371 (c)(1),
(2), (4) Date: Jan. 13, 2012

(87) PCT Pub. No.: WO2011/007658
PCT Pub. Date: Jan. 20, 2011

(65) Prior Publication Data
US 2012/0114337 A1 May 10, 2012

(30) Foreign Application Priority Data

Jul. 16, 2009 (JP) .................................. 2009-167627
Dec. 21, 2009 (JP) .................................. 2009-289435

(51) Int. Cl.
*H04B 10/00* (2013.01)
*H04B 10/112* (2013.01)
*H04B 10/118* (2013.01)

(52) U.S. Cl.
CPC .......... *H04B 10/1121* (2013.01); *H04B 10/118* (2013.01); *H04B 10/1123* (2013.01)

(58) Field of Classification Search
None
See application file for complete search history.

(56) References Cited

U.S. PATENT DOCUMENTS

| 3,609,374 A | * | 9/1971 | Gevas | G01S 3/789 250/203.3 |
| 4,933,928 A | * | 6/1990 | Grant | H04B 10/118 398/121 |
| 4,982,445 A | * | 1/1991 | Grant | H04B 10/118 250/491.1 |
| 5,142,400 A | * | 8/1992 | Solinsky | H04B 10/1127 356/139.05 |

(Continued)

FOREIGN PATENT DOCUMENTS

| EP | 1116959 A2 | 7/2001 |
| JP | 2-180311 A | 7/1990 |

(Continued)

OTHER PUBLICATIONS

Zhi et al., Acquisition methods for microsatellites laser communication in space, 2002, SPIE, pp. 372-379.*
Communication dated May 3, 2016 from the European Patent Office in counterpart application No. 10799718.1.

*Primary Examiner* — Ken N Vanderpuye
*Assistant Examiner* — Jai Lee
(74) *Attorney, Agent, or Firm* — Sughrue Mion, PLLC

(57) ABSTRACT

There have been problems that a capturing device requires an optical source having a large power output, and a scanning operation and a capturing operation must be alternately performed by the respective devices.

A capturing device is provided with an optical receiver which receives a beam from outside as a reception beam, a reception beam capturing unit which performs a capturing operation by which the reception beam is introduced to the optical receiver, an optical transmitter which generates a transmission beam transmitted to the outside, a transmission beam scanning unit which performs a scanning operation of the transmission beams, and an optical circulator wherein the incidence of the reception beam and the exit of the transmission beam are performed at the same terminal.

11 Claims, 13 Drawing Sheets

(56) References Cited

U.S. PATENT DOCUMENTS

| | | |
|---|---|---|
| 5,347,387 A | 9/1994 | Rice |
| 5,592,320 A * | 1/1997 | Wissinger ............ H04B 10/118 |
| | | 398/121 |
| 6,347,001 B1 * | 2/2002 | Arnold ................. H04B 10/118 |
| | | 398/122 |
| 6,590,685 B1 * | 7/2003 | Mendenhall ............ G01S 3/786 |
| | | 250/491.1 |
| 2003/0043435 A1 * | 3/2003 | Oettinger ........... H04B 10/1123 |
| | | 398/129 |

FOREIGN PATENT DOCUMENTS

| | | |
|---|---|---|
| JP | 2518066 B2 | 6/1991 |
| JP | 3152490 A | 6/1991 |
| JP | 7-307703 A | 11/1995 |
| JP | 10-233738 A | 9/1998 |
| JP | 2000-165327 A | 6/2000 |
| JP | 2000-180652 A | 6/2000 |
| JP | 2001-203641 A | 7/2001 |
| JP | 2001-244893 A | 9/2001 |

* cited by examiner

CAPTURING DEVICE, CAPTURING METHOD, AND CAPTURING PROGRAM

CROSS REFERENCE TO RELATED APPLICATIONS

This application is a National Stage of International Application No. PCT/JP2010/060929 filed on Jun. 21, 2010, which claims priority from Japanese Patent Application Nos. 2009-167627, filed on Jul. 16, 2009 and 2009-289435 filed Dec. 21, 2009, the contents of all of which are incorporated herein by reference in their entirety.

TECHNICAL FIELD

The present invention relates to a capturing device, a capturing method and a capturing program and in particular, relates to a capturing device, a capturing method and a capturing program of a communication beam in an optical communication.

BACKGROUND ART

As a communication using light, a fiber optics communication using optical fibers is known. The fiber optics communication uses a low-loss optical fiber and a semiconductor laser, and is developing as a long distance communication network. However, in the fiber optics communication, due to loss in optical fibers and wavelength dispersion or the like, the communication distance is limited up to about 100 km.

Relative to such optical fibers, free space, especially cosmic space, becomes a high-quality communication path with less absorption, scattering and dispersion or the like of light. Optical communication technology using this free space as a communication path can realize a communication in the distance of several thousand km to several tens of thousands of km, such as a communication of inter artificial satellite in orbit around the earth, or a communication between an artificial satellite and an ground station.

Other than the optical communication, as a communication using free space as a communication path, there is a microwave communication which uses microwaves. Incidentally, a beam diffusion angle of electromagnetic waves such as light and microwaves used for a communication is proportional to the wavelength of electromagnetic waves to be used. The wavelength of light is several hundred nm, and this is very short with about one part several thousandth to one part several hundred thousandth of the wavelength (1 mm-0.1 m) of microwave used for a satellite communication. For this reason, relative to the microwave communication, the optical communication can narrow down a beam to be used, can make energy density of communication beam having reached an opposite device high, and can establish a communication system with high energy efficiency.

Thus, the optical communication can establish a communication system with high energy efficiency, however, it needs alignment of the beam direction with high accuracy because a beam diffusion angle is narrow.

Further, in the optical communication, because the communication distance is long, large displacement of beam at a communication destination occurs caused by a slight fluctuation in position and angle of communication devices due to a vibration or the like. Therefore, it is difficult to maintain a long-distance optical communication while fixing the direction of the beam even it is between artificial satellites each other in geostationary orbit of the earth.

Therefore, a capturing device of the optical communication is maintaining communication by providing a tracking mechanism which follows the partner according to the change in the direction of the communication partner or the displacement of own device.

Further, in a communication between a geostationary satellite and an artificial satellite moving in orbit around the earth, in a communication between artificial satellites moving in orbit around the earth, or in a communication between an artificial satellite moving in orbit around the earth and a ground station, the capturing device of the optical communication also needs capturing operation to find out the communication partner because the communication partner appears in and deviates from the communication possible range.

For this reason, the capturing device of the optical communication using free space is equipped with a capturing mechanism to perform capturing operation for finding out the communication partner and a tracking mechanism to follow the partner which is moving.

Particularly, in a communication such as between an artificial satellite and a ground station, the capturing device of the optical communication needs to support two different requirements, one is moving nearly 180-degree range of half of the sky and the other is direction alignment less than 1-degree to a device locating several thousand km away. It is difficult to realize such requirements by one mechanism. Accordingly, the generally used capturing device of the optical communication is realizing by providing a coarse capturing mechanism unit which has a large movable range but slow operation speed and a fine capturing mechanism unit which has a fast response speed but a narrow movable range. (For example, refer to patent documents 1 and 2.)

Incidentally, the capturing device finds the direction of communication partner using a receiving optical beam from the partner. Also, the capturing device transmits a transmission beam from own device based on the partner's direction found by the receiving optical beam. However, because the communication distance is long in the optical communication, even if a high-speed optical beam is being used, the position of the partner is changed during the time between when the partner transmitted the beam and when the beam of this side reaches the partner. Therefore, it needs compensation of the direction for sending out a transmission beam based on the partner's direction found by a reception beam in consideration of position change of the partner. An angle of the difference in directions of a reception beam and a transmission beam is called aberration. The capturing device of the optical communication equipped with an aberration compensation mechanism is used in order to compensate the aberration of a transmission beam. (For example, refer to patent document 3.)

The capturing device of the communication device equipped with such mechanism performs capturing operation first for finding out a direction of the partner in order to communicate.

A rough direction or the like in orbit of a satellite can be predicted in advance to some extent. However, because a diffusion angle of beam used for usual communication is narrow, it is difficult to predict a direction of the communication partner with accuracy as much a diffusion angle of beam. Therefore, the capturing operation for finding out the partner's direction is performed.

As this capturing operation, for example, there is one which performs the capturing operation using beacon light which is large in output power and also large in a diffusion angle compared with a communication beam. (For example, refer to patent document 4.)

One example of a capturing device using beacon light which is generally used is shown in FIG. 8.

The capturing device 8 of captured side irradiates with a beacon light having a wide diffusion angle from a beacon optical system 51. The beacon light here has a diffusion angle covering predicted angular range where the partner of a capturing side. Further, because the beacon light needs to be irradiated with quite a wide diffusion angle compared with such a beam used for an ordinary communication and also it secures a predetermined energy density when it arrives at the partner, it needs a high output power optical system. The beacon light outputted from the beacon optical system 51 is irradiated to the partner's device (not shown), at that time, it is irradiated as the beacon light which is keeping an enough diffusion angle to the partner's device using an optical antenna 52 and a coarse capturing mechanism unit 11.

A capturing controller 53 of the capturing device 8, which is the side of performing capturing operation, first, aligns the coarse capturing mechanism unit 11 with the prediction direction of the partner using a coarse capturing control signal 34. On the other hand, the capturing controller 53 sets a fine capturing mechanism unit 12 to face an initial direction using a fine capturing control signal 35. In this state, the capturing controller 53 waits for the beacon light from the partner's device. The beacon light from the partner's device is received in a capturing sensor 32 via the coarse capturing mechanism unit 11, the optical antenna 52, the fine capturing mechanism unit 12 and a beam splitter 16. As far as the beacon light has an enough diffusion angle and a high intensity, the capturing device 8 can always receive such beacon light in the capturing sensor 32. The capturing sensor 32 outputs a capturing sensor signal 33 which indicates the direction of the received beacon light to the capturing controller 53. The capturing controller 53 controls the direction of the fine capturing mechanism unit 12 so that the center of the beacon light may be aligned with the center of the capturing sensor 32 using the fine capturing control signal 35 from the capturing sensor signal 33. Further, the capturing controller 53 can operate the coarse capturing mechanism unit 11 using a coarse capturing control signal 34 as necessary.

In contrast, the capturing controller 31 can also perform the capturing operation by scanning a transmission beam.

Further, a transmission beam of a sending end device will be a reception beam at a receiving end device. In the description below, there may be a case that both of beams are called scanning beams as a matter of convenience in order to avoid complication.

An example of scanning operation using a scanning beam which is generally used is shown in FIG. 9.

In case of this example, a device of one side (a device X in FIG. 9) performs scanning the whole movable range using a scanning beam, and the capturing operation is performed with detecting the scanning beam at a device of the other side (a device Y in FIG. 9). The capturing operation performed by the device Y will not be completed by only one scanning operation of the device X. Therefore, it is needed to repeat the scanning operation of the device X more than once.

At a stage when the device Y has completed the capturing operation, this time, the device Y performs the scanning operation using a scanning beam, and the device X performs the capturing operation. Further, because the capturing operation of the device Y has been completed at this stage, the scanning beam from the device Y surely reaches the device X. Therefore, the capturing operation performed by the device X is completed in a short time compared with the capturing operation by the device Y.

However, in such a capturing device, because it needs to scan the whole scanning range more than once using a narrow scanning beam, it needs a long time for the scanning operation. As a result, the capturing time at the partner's device also becomes long.

Accordingly, in order to reduce the capturing time, as shown in FIG. 10, a capturing device adopting a method by which the scanning operation and the capturing operation are to be performed alternately at both of devices is used.

In the capturing method in the capturing device shown in FIG. 10, first, a device of one side (a device X in FIG. 10) performs the scanning operation (scan 1) of a scanning beam. The other side device (a device Y in FIG. 10) performs the capturing operation to the scanning operation. The device Y can narrow the scanning range of own device (the device Y) down to some extent based on this capturing operation. The device Y performs the scanning operation (scan 2) in the range having been narrowed down.

The device X performs the capturing operation to scan 2 performed by the device Y, and when the capturing operation having been completed, this time, the device X performs scan 2 which the scanning range has been narrowed down to the device Y similarly. The device Y performs the capturing operation to scan 2 performed by the device X. Using scan 2, the device Y can detect more accurate direction of the partner than scan 1, and can further narrow the scanning range down.

Because the direction of the partner is narrowed down mutually with narrowing the scanning range down in this manner, the capturing device described with reference to FIG. 10 realizes the capturing operation in which the capturing time has been reduced compared with the capturing operation in the capturing device described with reference to FIG. 9.

Further, in such a capturing device, in order to reduce misalignment between a transmission beam and a reception beam, it is also performed to form coaxial optical axes. (For example, refer to patent document 5.)

[Patent document 1] Japanese Patent No. 2518066 (Japanese Patent Application publication No. 1991-152490)

[Patent document 2] Japanese Patent Application Publication No. 2001-203641

[Patent document 3] Japanese Patent Application Publication No. 1995-307703

[Patent document 4] Japanese Patent Application Publication No. 1998-233738

[Patent document 5] Japanese Patent Application Publication No. 1990-180311

DISCLOSURE OF THE INVENTION

Problem to be Solved by the Invention

However, there was a problem that a high-power optical source is needed for the beacon light in the capturing device of patent document 4 mentioned above which uses the beacon light for the capturing operation.

Further, in the capturing device shown in FIG. 10, there was a problem that each of the devices should perform the scanning operation and the capturing operation alternately.

An object of the present invention is to solve the above-mentioned problems, and to provide a capturing device, a capture method and a capturing program which can reduce the time of the capturing operation.

Means for Solving a Problem

A capturing device of the present invention is characterized by including an optical receiver which receives a beam from outside as a reception beam, a reception beam capturing unit which performs capturing operation which introduces the reception beam to the optical receiver, an optical transmitter which generates a transmission beam to transmit to outside, a transmission beam scanning unit which performs scanning operation of the transmission beam, and an optical circulator in which the same terminal is used for incidence of the reception beam and exit of the transmission beam.

A capturing method of the present invention is characterized by including, capturing a beam from outside as a reception beam, and performing scanning operation of a transmission beam for transmitting to outside independently from the capturing step.

A capturing program of the present invention is characterized by causing a computer to execute processing of, capturing processing for capturing a beam from outside as a reception beam, and scanning processing for performing scanning operation of a transmission beam for transmitting to outside independently from the capturing processing.

Effect of the Invention

A capturing device, a capture method and a capturing program of the present invention can obtain an effect on completing capturing operation in a short time period without using beacon light based on carrying out scanning operation and capturing operation simultaneously.

DESCRIPTION OF THE CODES

Figure 1:
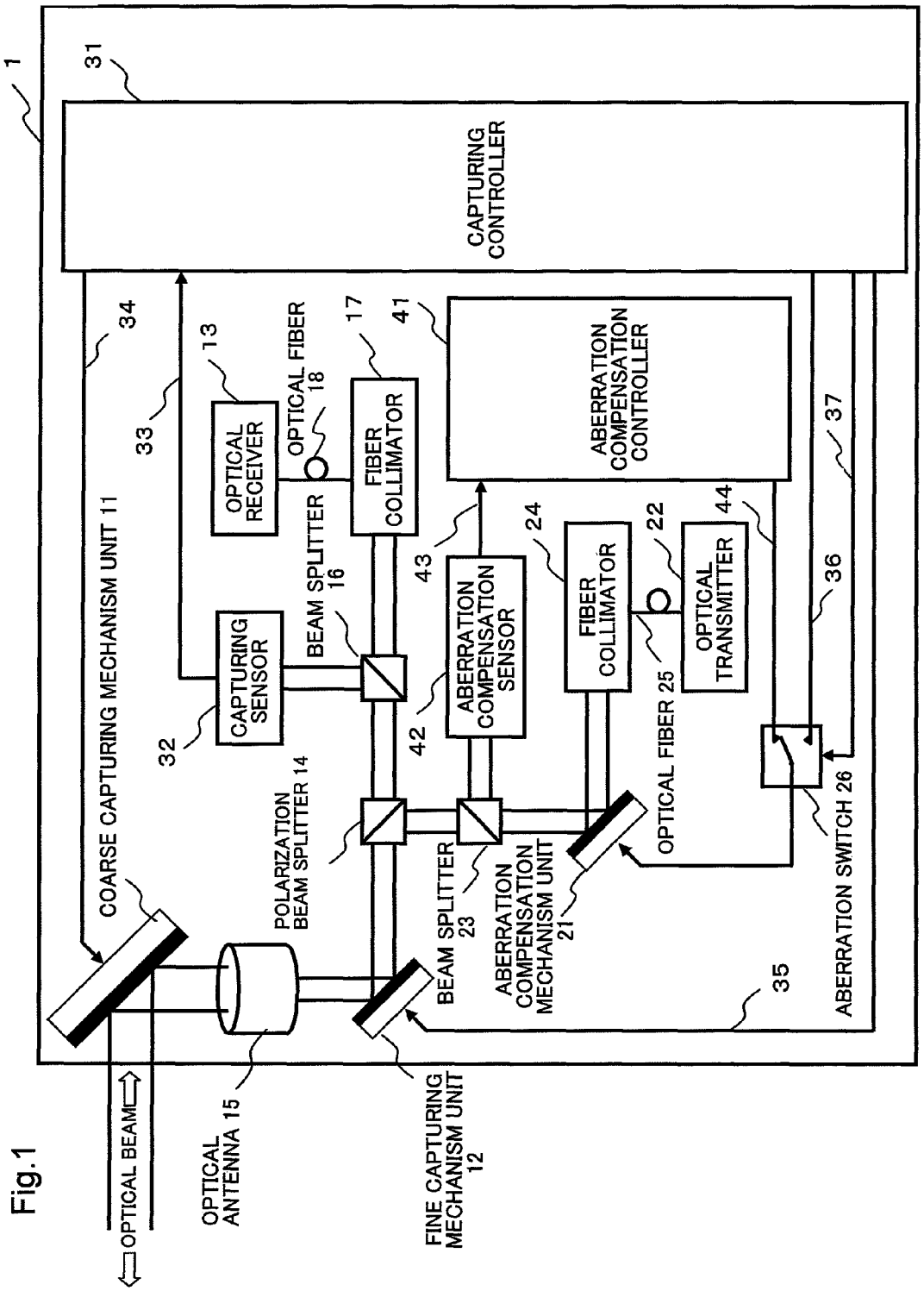
FIG. 1 is a block diagram showing a configuration of the first exemplary embodiment of the present invention.

1 Capturing device
2 Capturing system
3 Control device
4 Capturing device
6 Capturing device
8 Capturing device
11 Coarse capturing mechanism unit
12 Fine capturing mechanism unit
13 Optical receiver
14 Polarization beam splitter
15 Optical antenna
16 Beam splitter
17 Fiber collimator
18 Optical fiber
19 Coarse capturing mechanism unit
21 Aberration compensation mechanism unit
22 Optical transmitter
23 Beam splitter
24 Fiber collimator
25 Optical fiber
26 Aberration switch
31 Capturing controller
32 Capturing sensor
33 Capturing sensor signal
34 Coarse capturing control signal
35 Fine capturing control signal
36 Scanning control signal
37 Switching control signal
41 Aberration controller
42 Aberration sensor
43 Aberration sensor signal
44 Aberration control signal
51 Beacon optical system
52 Optical antenna
53 Capturing controller
61 Scanning controller
62 Coarse capturing switch
63 Capturing controller
64 Scanning controller control signal
65 Scanning operation information
66 Coarse capturing switching control signal
67 Coarse scanning control signal
68 Fine scanning control signal

BEST MODE FOR CARRYING OUT THE INVENTION

Next, exemplary embodiments of the present invention will be described in detail with reference to drawings.

First, configuration and operation of the first exemplary embodiment of the present invention will be described with reference to FIGS. 1-5.

First, a configuration of a capturing device 1 according to the first exemplary embodiment of the present invention will be described with reference to FIG. 1.

The configuration related to a reception beam received from the partner's device will be described.

A coarse capturing mechanism unit 11 is controlled by a coarse capturing control signal 34 from a capturing controller 31, performs a coarse adjustment of the direction of a reception beam received from the partner, and introduces the reception beam after the coarse adjustment to an optical antenna 15.

The optical antenna 15 narrows a beam diameter of the incident reception beam, and sends it to a fine capturing mechanism unit 12. The fine capturing mechanism unit 12 is controlled by a fine capturing control signal 35 from the capturing controller 31, performs a fine adjustment of the direction of the reception beam received from the optical antenna 15, and sends the reception beam after the fine adjustment to a polarization beam splitter 14.

The polarization beam splitter 14 functions as an optical circulator. It can assume various optical paths having different angles as an optical path of the optical circulator. However, in the description of this exemplary embodiment, the optical path is one which sends the reception beam to a beam splitter 16 without changing its optical axis.

The beam splitter 16 sends a part of the reception beam to a capturing sensor 32 and sends the rest to a fiber collimator 17.

The fiber collimator 17 concentrates the reception beam and introduces to an optical fiber 18. The optical fiber 18 sends the concentrated reception beam to an optical receiver 13. The optical receiver 13 extracts a reception data from the received reception beam, and outputs to a higher-hierarchy device or the like which is not shown.

The capturing sensor 32 detects the direction of the incident reception beam using a built-in optical sensor which is not shown, and outputs a capturing sensor signal 33 which indicates the direction of the beam to the capturing controller 31.

Next, a configuration related to a transmission beam which is sent to the partner's device will be described.

An optical transmitter 22 receives a transmission data from a higher-hierarchy device or the like which is not shown, generates transmission light based on the transmission data, and sends to an optical fiber 25. The optical fiber 25 introduces the received transmission light to a fiber collimator 24. The fiber collimator 24 converts the transmission light into the transmission beam (parallel beam) and introduces to an aberration compensation mechanism unit 21.

The aberration compensation mechanism unit 21 changes the direction of optical axis of the transmission beam. Although the detailed operation will be described later, the aberration compensation mechanism unit 21 is controlled by a scanning control signal 36 from the capturing controller 31 or an aberration control signal 44 from an aberration controller 41, changes the direction of the transmission beam, and introduces to a beam splitter 23.

The beam splitter 23 introduces a part of the introduced transmission beam to an aberration sensor 42, and introduces the rest to the polarization beam splitter 14.

The aberration sensor 42 creates an aberration sensor signal 43 which indicates the direction of the transmission beam from the received transmission beam, and outputs to the aberration controller 41.

The polarization beam splitter 14 introduces the incident transmission beam to the direction of the fine capturing mechanism unit 12 by changing the direction of its optical axis.

The fine capturing mechanism unit 12 introduces the incident transmission beam to the optical antenna 15. The optical antenna 15 expands diameter of the transmission beam and introduces the transmission beam to the coarse capturing mechanism unit 11. The coarse capturing mechanism unit 11 irradiates the incident transmission beam to the partner's device.

Based on such a configuration, the capturing device 1 according to this exemplary embodiment configures an optical system which can perform the scanning operation of the transmission beam independently from an optical system relating to the reception beam. Based on having this configuration, the capturing device 1 according to this exemplary embodiment can concurrently perform the capturing operation using the reception beam and the scanning operation using the transmission beam.

Further, the capturing device 1 according to this exemplary embodiment has a configuration which introduces the transmission beam to the fine capturing mechanism unit 12 using the polarization beam splitter 14 which receives the transmission beam from the aberration compensation mechanism unit 21. In other words, the capturing device 1 according to this exemplary embodiment is constituted so that the polarization beam splitter 14 may function as an optical circulator in which the same terminal is used for incidence of the reception beam and exit of the transmission beam. Based on such a configuration, the capturing device 1 according to this exemplary embodiment can adjust each of optical axes of the reception beam and the transmission beam overlapping on almost the same optical axis.

As will be described later, during the capturing operation and the tracking operation or the like, an optical system related to the reception beam including the coarse capturing mechanism unit 11 and the fine capturing mechanism unit 12 is facing the direction of the partner's device based on the reception beam. Therefore, the capturing device 1 according to this exemplary embodiment has a configuration which also irradiates the transmission beam to the direction of the partner's device based on a configuration which irradiates the transmission beam using the coarse capturing mechanism unit 11 and the fine capturing mechanism unit 12. In other words, in the scanning operation and the aberration compensation operation using the aberration compensation mechanism unit 21 which will be described later, the capturing device 1 has a configuration in which the optical axis of the transmission beam to the optical axis of the reception beam shifts only up to the angle which becomes the largest in each operation (scanning operation or aberration compensation operation). (Hereinafter, the maximum angle in the scanning operation is referred to as the maximum scanning angle.)

Based on such a configuration, even in a communication with a device of several thousands of km away, the capturing device 1 according to this exemplary embodiment can perform the scanning operation using the transmission beam concurrently with the capturing operation which is performed based on the reception beam from the direction of the partner's device.

Finally, a configuration relating to controllers will be described.

The capturing controller 31 controls each part of the capturing device 1 based on the capturing sensor signal 33 or the like. Specifically, the capturing controller 31 respectively controls the coarse capturing mechanism unit 11 using the coarse capturing control signal 34, the fine capturing mechanism unit 12 using the fine capturing control signal 35, the aberration compensation mechanism unit 21 using the scanning control signal 36, and a aberration switch 26 using a switching control signal 37.

The aberration controller 41 receives the aberration sensor signal 43 and controls the aberration compensation mechanism unit 21 using the aberration control signal 44.

The aberration switch 26 is controlled by using the switching control signal 37 from the capturing controller 31, and sends out either of the scanning control signal 36 from the capturing controller 31 or the aberration control signal 44 from the aberration controller 41 to the aberration compensation mechanism unit 21 as a control signal.

Next, operation of the capturing device 1 according to this exemplary embodiment will be described.

First, the scanning operation using the transmission beam, with regard to a case where the partner performs the capturing operation, will be described.

The capturing controller 31 controls the aberration compensation mechanism unit 21 using the scanning control signal 36, makes a transmission beam from the optical transmitter 22 scan, and performs the scanning operation. In order to carry out this scanning operation, the capturing controller 31, first, switches the aberration switch 26 using the switching control signal 37, and sets so that a scanning control signal 36 which the capturing controller 31 outputs may input to the aberration compensation mechanism unit 21. After that, the capturing controller 31 controls, using the scanning control signal 36, so that the aberration compensation mechanism unit 21 may move along the predetermined scanning range at the predetermined speed and scanning path. The capturing controller 31 performs the scanning operation by changing the direction of the transmission beam which is sent to the partner from the optical transmitter 22 based on the control.

Next, the capturing operation performed by the capturing device 1 while the partner is performing the scanning operation will be described.

When the capturing controller 31 starts the capturing operation, the capturing controller 31, first, acquires a planned direction where the partner's device (such as a satellite) may exist from a database, and obtains a rough direction where the partner's device exists. Then, based on the obtained direction, the capturing controller 31 sets the coarse capturing mechanism unit 11 to face a predicted direction where the partner's device exists using the coarse capturing control signal 34. (Hereinafter, this operation may be called program operation.)

Next, the capturing controller 31 also sets an initial direction of the fine capturing mechanism unit 12 using the fine capturing control signal 35. As the initial direction of the fine capturing mechanism unit 12 of this exemplary embodiment, the center of movable range is set so as to secure a movable range after detection of the partner's direction.

After that, the capturing controller 31 waits for arrival of the transmission beam transmitted based on the scanning operation of the partner's device. When the partner's device performs the scanning operation at an appropriate range, the capturing sensor 32 can detect the transmission beam from the partner's device. When having received the transmission beam, the capturing sensor 32 outputs the capturing sensor signal 33 which indicates the detected direction to the capturing controller 31.

Further, when the transmission beam cannot be detected even if a predetermined time has passed, the capturing controller 31 performs retry operation such as rotating the direction of the coarse capturing mechanism unit 11 only a predetermined angle and performing detection operation once again.

The capturing controller 31 distinguishes the direction where the transmission beam was detected based on the received capturing sensor signal 33. Based on the result, the capturing controller 31 turns the fine capturing mechanism unit 12 to the direction where the transmission beam has come using the fine capturing control signal 35.

Further, the capturing controller 31 may perform coarse capturing operation, as necessary, to make the coarse capturing mechanism unit 11 face the direction where the transmission beam has come using the coarse capturing control signal 34 in such a case where the detection position of sensor detected by the capturing sensor signal 33 is considerably deviated.

The capturing operation performed using the fine capturing mechanism unit 12 will be described more in detail with reference to FIG. 2.

Figure 2:
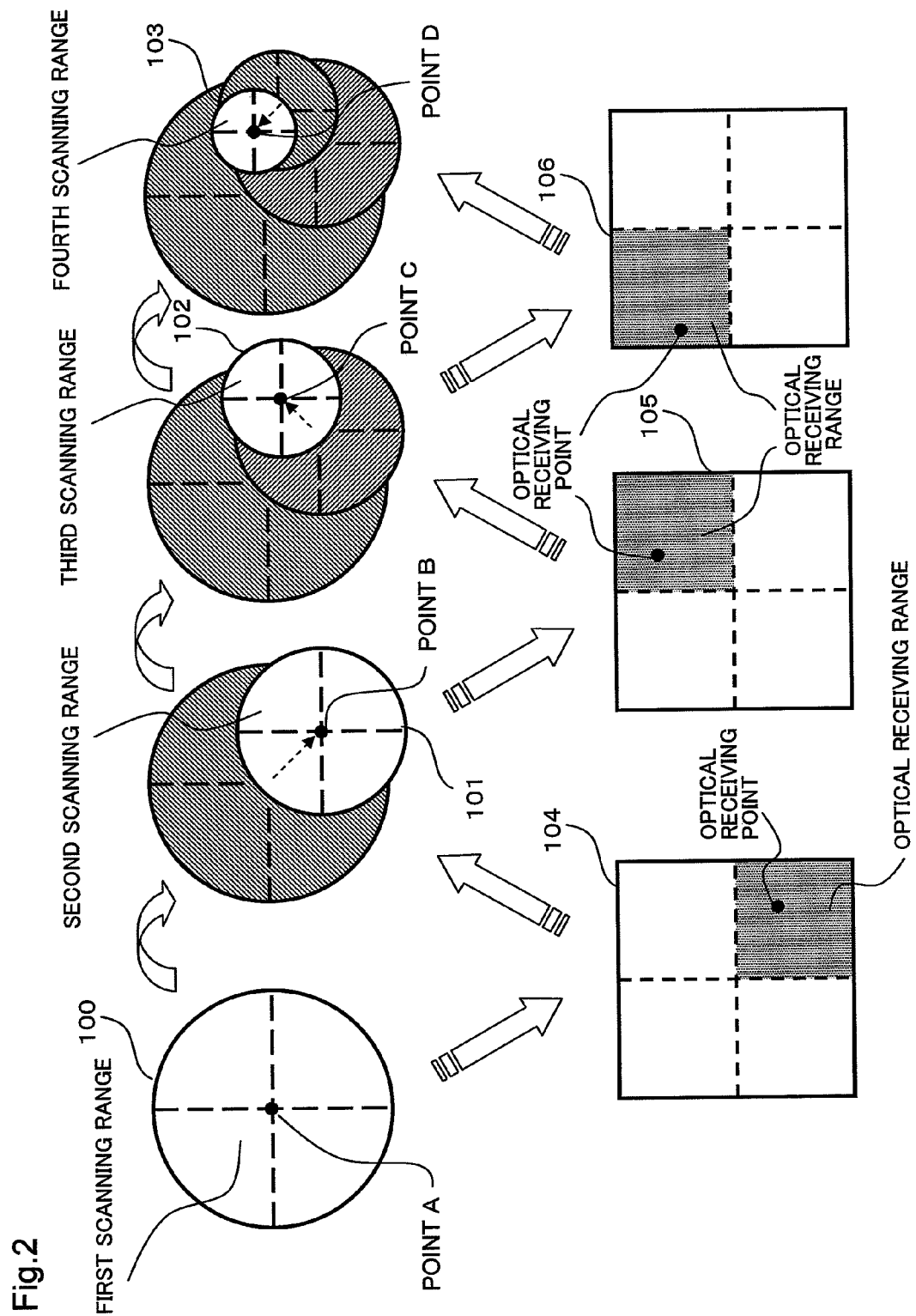
FIG. 2 is a schematic diagram showing scanning ranges and detection areas of a sensor of the first exemplary embodiment of the present invention.

FIG. 2 is a schematic diagram showing the scanning ranges of the capturing device 1 according to the first exemplary embodiment of the present invention and the detection areas of the capturing sensor 32. A series of scanning ranges 100-103 of an upper row of FIG. 2 indicate the ranges where scanned by the transmission beam.

As will be described later, the scanning operation is performed in a shape of an approximate concentric circle, and the scanning range 100 indicates a scanning range of the first scanning operation, and is the whole possible range for scanning (the first scanning range). As will be described in detail later, when it has known the direction where the partner's device exists, the capturing controller 31 changes the scanning range. However, the scanning range in that case is narrowed gradually as shown in the scanning ranges 101-103 (the second scanning range to the fourth scanning range).

A series of detection area 104 to detection area 106 in a lower row of FIG. 2 indicate each state how the transmission beam is received in the capturing sensor 32. According to this exemplary embodiment, although a quadrant sensor is used as the capturing sensor 32, this is an example and is not limited to this as a matter of course.

Further, the center (the center of an approximate concentric circle scan) of scanning operation of the transmission beam in this exemplary embodiment is shifted by a value of aberration as will be described later. Therefore, strictly speaking, the center of scanning range is shifted from the center of the direction of the fine capturing mechanism unit 12 by a value as many as aberration. However, because the aberration itself is small and also the figure becomes complicated, FIG. 2 is a figure in which aberration is omitted. (Further, if regarding the scanning ranges of FIG. 2 as the scanning ranges in the partner's device at which the transmission bean has arrived, it does not need to consider aberration, and the relation between the center of the scanning range and the center of the direction of the fine capturing mechanism unit 12 becomes the relation as shown in FIG. 2.)

First, the scanning operation using the aberration compensation mechanism unit 21 is performed to the whole scanning range (a circle of the first scanning range of the scanning range 100). Further, the fine capturing mechanism unit 12 is facing the initial direction, i.e., the direction of the center (point A).

When the capturing sensor 32 receives a transmission beam (detection area 104) which has been transmitted by the scanning operation of the partner's device during the scanning operation to the first scanning range, a change of the scanning range occurs. In case of this detection area 104, because the capturing sensor 32 is detecting receiving light by the optical receive part at a lower right position among the optical receive parts being divided into four, it outputs the capturing sensor signal 33 which indicates this.

The capturing controller 31 which has received the capturing sensor signal 33 knows that the capturing sensor 32 received the reception beam at the optical receive part of the lower right position, and realizes that the direction where the partner's device exists is being fallen within a quarter range of the lower right position among optical receivable areas of the capturing sensor 32. Accordingly, the capturing controller 31 aligns the direction of the fine capturing mechanism unit 12 on the center of the range of the lower right position (point B of the scanning range 101). (Hereinafter, the operation for aligning the fine capturing mechanism unit 12 on a specific direction may be called directivity operation.)

Further, the capturing controller 31 changes the scanning range which the aberration compensation mechanism unit 21 performs to the lower right position (a circle of the second scanning range of the scanning range 101), and continues scanning. According to this exemplary embodiment, the area of the second scanning range is made approximately a quarter of the area of the first scanning range.

During scanning the second scanning range, the capturing sensor 32 detects the next receiving light (detection area 105). Here, it is showing an example that the detecting direction is an optical receive part of the upper right position of the capturing sensor 32.

The capturing controller 31 realizes that the direction of the partner locates in the upper right part of the present scanning range because it has detected the beam at the optical receive part of the upper right position of the capturing sensor 32. Accordingly, the capturing controller 31 directs the fine capturing mechanism unit 12 toward the direction of the center (point C of the scanning range 102) of the upper right part of the range where having narrowed down previously (the second scanning range). Further, similarly, the capturing controller 31 changes the scanning range, which the aberration compensation mechanism unit 21 performs, so as to become also the upper right position (a circle of the third scanning range of the scanning range 102).

The area of the third scanning range is approximately a quarter of the second scanning range, and is made approximately 1/16 compared with the first scanning range.

The capturing controller 31 repeats this operation until it can judge that the capturing operation has converged. According to this exemplary embodiment, the judgment that the capturing operation has converged (completed) is made when the size of the scanning range has become smaller than the predetermined size (for example, the diffusion angle of the transmission beam).

Further, the judgment condition is not limited to this, and it is not necessary to say that the other judgment conditions may be adopted. For example, as a condition of completion, the capturing controller 31 may adopt the condition that the amount of movement by the directivity operation of the fine capturing mechanism unit 12 has become shorter than the predetermined length.

The capturing controller 31, when having judged that the capturing operation had converged, completes the capturing operation and moves to the tracking operation.

Finally, the aberration compensation operation will be described.

When the partner's device having moved to the tracking operation (the description will be omitted due to well-known technology) from the capturing operation, and the scanning operation has been completed, the capturing controller 31 sets the aberration switch 26 to a side of the aberration control signal 44 from the aberration controller 41 using the switching control signal 37. The aberration controller 41 which has received the aberration sensor signal 43 from the aberration compensation sensor 42 figures out the difference between the direction of the transmission beam obtained from the aberration sensor signal 43 and the direction for obtaining necessary aberration, creates the aberration control signal 44 which compensates the difference, and sends it to the aberration compensation mechanism unit 21. The aberration compensation mechanism unit 21 which has received the aberration control signal 44 sets the optical axis direction of the transmission beam so that it may face the direction by which the necessary aberration for the transmission beam is obtained.

Further, for example, the necessary aberration can be obtained from the distance with the partner's device and the moving speed of the partner's device based on the already described database which the coarse capturing mechanism unit 11 is using.

The aberration compensation operation can be performed based on such configurations.

Figure 3:
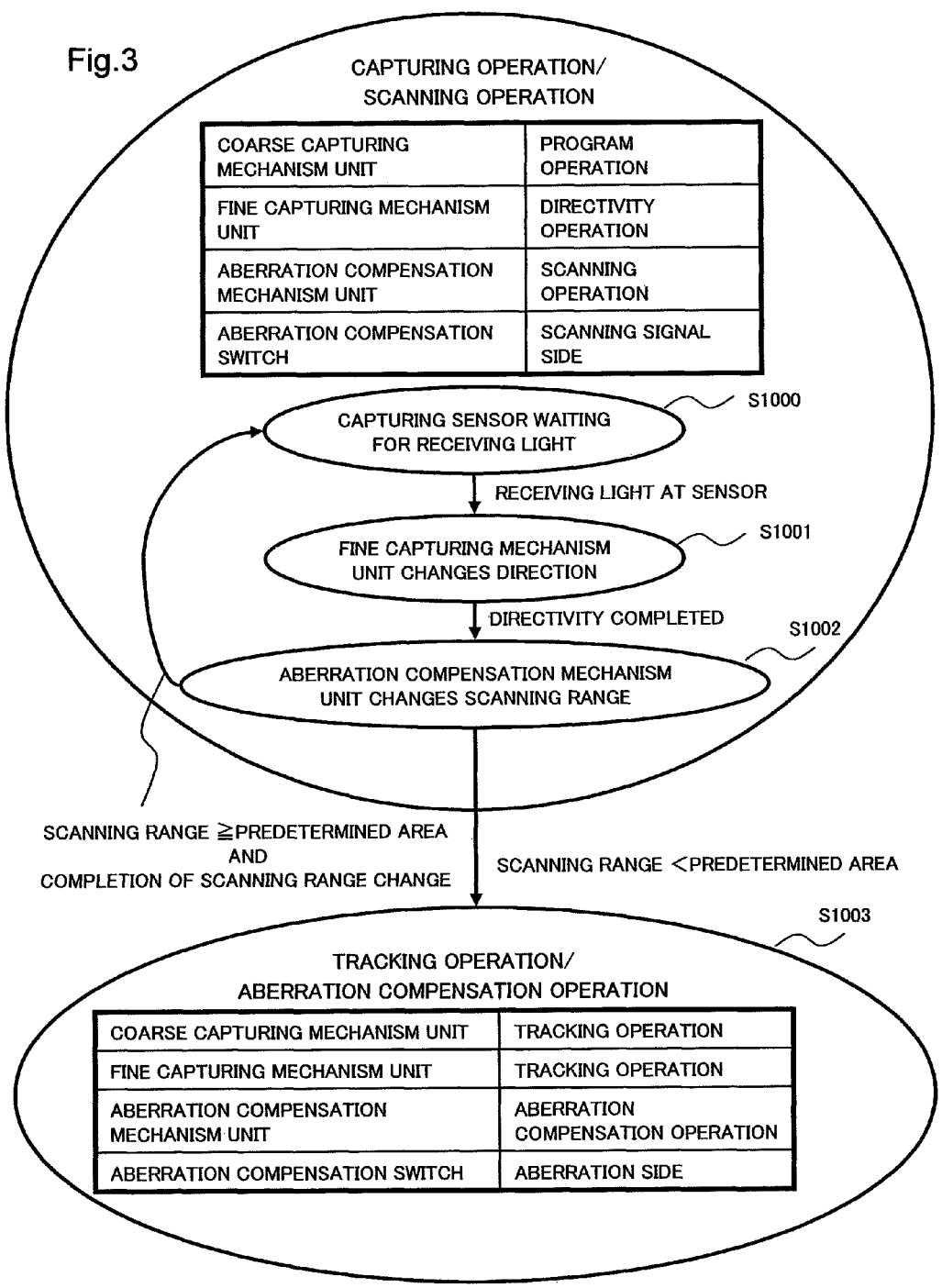
FIG. 3 is a state transition diagram of operation of the first exemplary embodiment of the present invention.

FIG. 3 is a state transition diagram which summarizes the operation states of the capturing device 1 according to the first exemplary embodiment.

Details of the state transition of each operation will be described with referring FIG. 3.

In capturing operation/scanning operation, the coarse capturing mechanism unit 11 is the state of program operation, the fine capturing mechanism unit 12 is the state of directivity operation, the aberration compensation mechanism unit 21 is the state of scanning operation, and the aberration switch 26 is the state of setting on the scanning operation side.

First, the capturing device 1 is in a waiting state for receiving light of the transmission beam corresponding to the scanning operation of the partner's device using the capturing sensor 32 (Step S1000).

When the capturing sensor 32 receives the transmission beam from the partner's device, the fine capturing mechanism unit 12 changes the directive direction in accordance with the receiving light received by the capturing sensor 32 based on an instruction of the capturing controller 31 (Step S1001). The scanning range of the aberration compensation mechanism unit 21 is also changed to the range having been narrowed down (Step S1002). And the capturing controller 31 returns to the next waiting state for receiving light.

Whenever optical reception at the capturing sensor 32 is repeated, the capturing controller 31 repeats similar operations, performs change in the directive direction of the fine capturing mechanism unit 12, and narrows down the scanning range of the aberration compensation mechanism unit 21. As a result, the scanning range of scanning operation performed by the aberration compensation mechanism unit 21 becomes smaller than the predetermined range and a stage that it does not need to perform the scanning operation, the capturing controller 31 moves to tracking operation/aberration compensation operation (Step S1003).

In tracking operation/aberration compensation operation, the coarse capturing mechanism unit 11 and the fine capturing mechanism unit 12 are the state of tracking operation, the aberration compensation mechanism unit 21 is the state of aberration compensation operation, and the aberration switch 26 is the state of setting on the aberration side.

Thus, the capturing device 1 of this exemplary embodiment can perform the scanning operation performed by the aberration compensation mechanism unit 21 concurrently with the capturing operation performed by the fine capturing mechanism unit 12. And the capturing device 1 of this exemplary embodiment changes the directive direction of the fine capturing mechanism unit 12 and changes the scanning range of scanning operation performed by the aberration compensation mechanism unit 21 based on optical-receiving detection of the reception beam from the partner. As a result, the capturing device 1 of this exemplary embodiment can make time of the capturing operation be shortened. The scanning operation and the capturing operation will be described more in detail with reference to FIG. 4.

Figure 4:
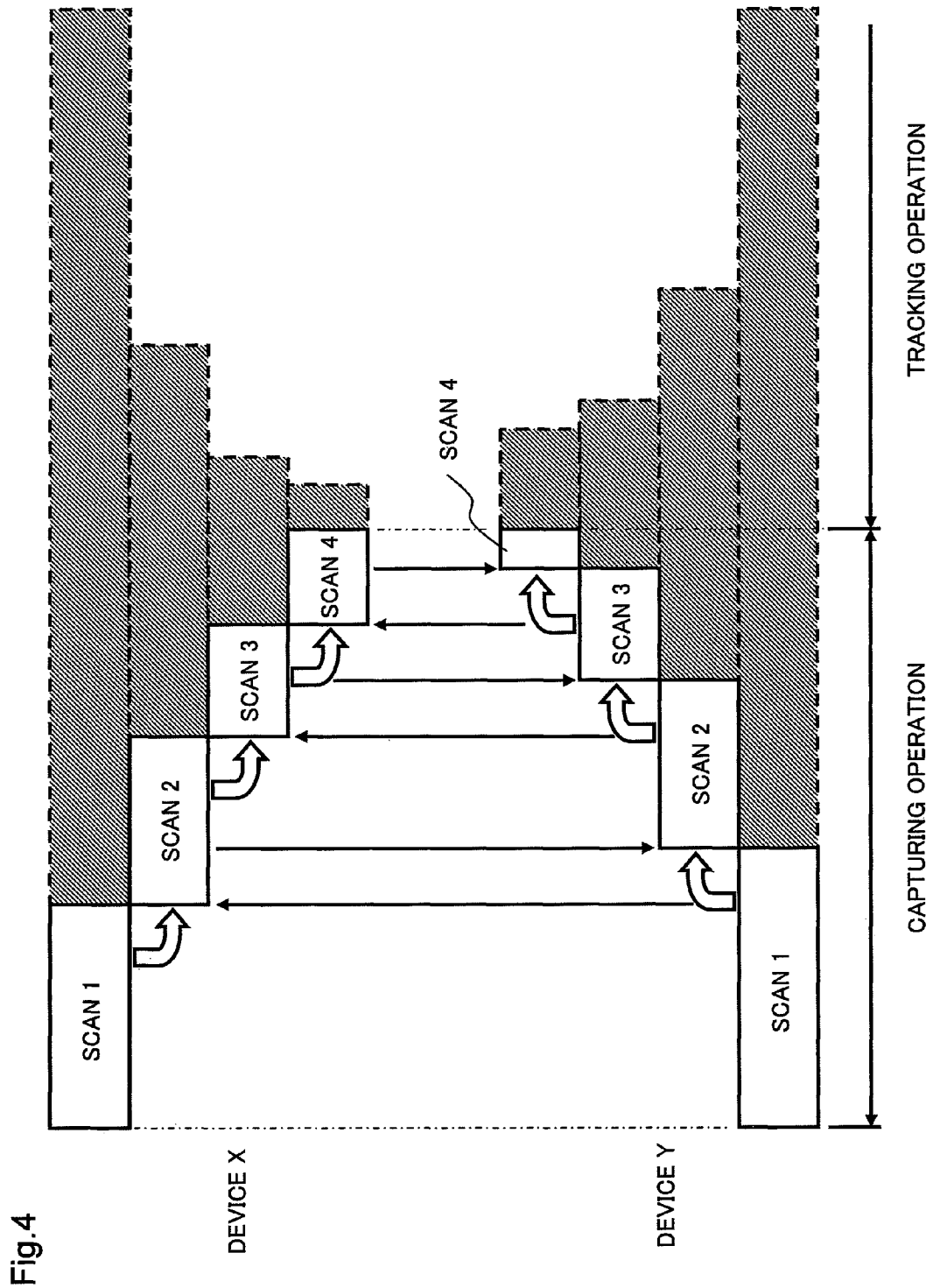
FIG. 4 is a sequence diagram of scanning operation of the first exemplary embodiment of the present invention.

FIG. 4 is a schematic diagram of the sequence of scanning operation of the capturing device 1 according to the first exemplary embodiment.

The upper row shows the sequence of scanning operation of one side capturing device (device X of FIG. 4), and the lower row shows the sequence of scanning operation of the capturing device in the other side (device Y of FIG. 4).

Further, in FIG. 4, a horizontal axis is a time axis. An arrow of up or down indicates each time when the capturing sensor 32 has detected a scanning beam caused by the scanning operation of the partner's device, and shows that change in the scanning range has occurred as a result. In this description, it describes a case where the device X has received light first, however, in a case where the device Y receives light first, it may read the device X and the device Y to be mutually replaced in the description below.

Further, the scanning time in each scanning operation is schematically indicated, and a portion without shaded indicates the time when the scanning operation has actually been performed, and the shaded portion indicates a supposed scanning time which would be needed if the scanning operation were continued. The shaded portion represents the unnecessary scanning time due to the result of detecting the scanning beam and the scanning range having been changed (for example, in case of moving from scan 1 to scan 2).

Further, each device is performing the capturing operation, however, the capturing operation in FIG. 4 is omitted for the sake of convenience of description because it works as one with the scanning operation respectively.

The operation in FIG. 4 is progressing as follows.

First, the device X receives a scanning beam from the device Y. The device X changes the scanning range (corresponding to the scanning range 101 from the scanning range 100 of FIG. 2) using the received light. As a result, the device X can omit the scanning operation corresponding to the shaded portion of scan 1. Next, the device Y receives a scanning beam from the device X and moves to scan 2 from scan 1 similarly.

Next, the device X receives a scanning beam from the device Y and moves to scan 3 from scan 2. Thus, each device repeats reception of light and transition of scanning operation independently in parallel, and each device completes the capturing operation and moves to the tracking operation when the scanning range has become narrower than a predetermined range.

According to this exemplary embodiment, as already described, the scanning range becomes a quarter in detection of each optical-receiving. In other words, according to this exemplary embodiment, the scanning range is getting geometrically narrower by approximately a quarter in detection of each scanning beam.

According to this exemplary embodiment, as will be described later, because a scanning path is provided as a path on which a scanning beam is overlapping, the area of the scanning range is almost proportional to the scanning time. Therefore, according to the scanning range is getting geometrically narrower, the scanning time is also getting geometrically shorter.

Further, a ratio of range to narrow down is proportional to the range which is narrowed down using the capturing sensor 32. Accordingly, when using a sensor which is more subdivided than a quadrant sensor of this exemplary embodiment, the capturing device 1 can apply the geometric progression which can converge more rapidly as the geometric progression of scanning range.

As above, the capturing device 1 in the first exemplary embodiment of the present invention can obtain the effect that it can make the capturing time short even if beacon light is not used.

The reason is because the capturing device 1 can perform the capturing operation and the scanning operation concurrently using the configuration which can perform the scanning operation using the aberration compensation mechanism unit 21 with performing the capturing operation using the fine capturing mechanism unit 12. Further, it is because that the capturing device 1 can reduce the time shorter which is needed for the scanning operation and the corresponding capturing operation, because the directivity operation of the fine capturing mechanism unit 12 and narrowing down of the scanning range of the aberration compensation mechanism unit 21 are performed based on the direction of the reception beam detected in the capturing operation.

Further, if the movable range of the aberration compensation mechanism unit 21 is narrower than the movable range of the fine capturing mechanism unit 12, there is a possibility that the facing direction, as a result of the directivity operation having performed by the fine capturing mechanism unit 12, deviates from the scanning range of the aberration compensation mechanism unit 21. In such a case, because the capturing operation cannot be performed any more, the capturing device 1 needs to perform a retry of the capturing operation.

Therefore, when making the movable range of the aberration compensation mechanism unit 21 at least the same as the movable range of the fine capturing mechanism unit 12 or wider, it can obtain the effect to reduce time wasted in the capturing operation.

The reason is because that as the scanning range of scanning beam which is scanned in the scanning operation by the aberration compensation mechanism unit 21 surely includes the range of the directivity operation which is performed by the fine capturing mechanism unit 12, even if the fine capturing mechanism unit 12 faces any direction in the directivity operation, it becomes the range where the scanning beam surely reach.

Further, according to this exemplary embodiment, it can obtain the effect that the scanning operation and the capturing operation can be performed in parallel and concurrently even in a long distance communication such as used by an optical communication in free space.

The reason is because that the reception beam from the partner's device and the transmission beam sent to the partner can be made an approximate identical optical axis, as an input terminal of the reception beam of the polarization beam splitter 14 as an optical circulator and a transmission terminal of the transmission beam are the same. As a result, it is also because the deviation between the reception beam and the transmission beam can be reduced even if the distance is far away.

Next, a scanning path of the transmission beam will be described with reference to FIG. 5.

Unlike the beacon light, the diffusion angle of transmission beam is quite narrow compared with the scanning range. Therefore, as a route for scanning the transmission beam, various things can be adopted.

Figure 5:
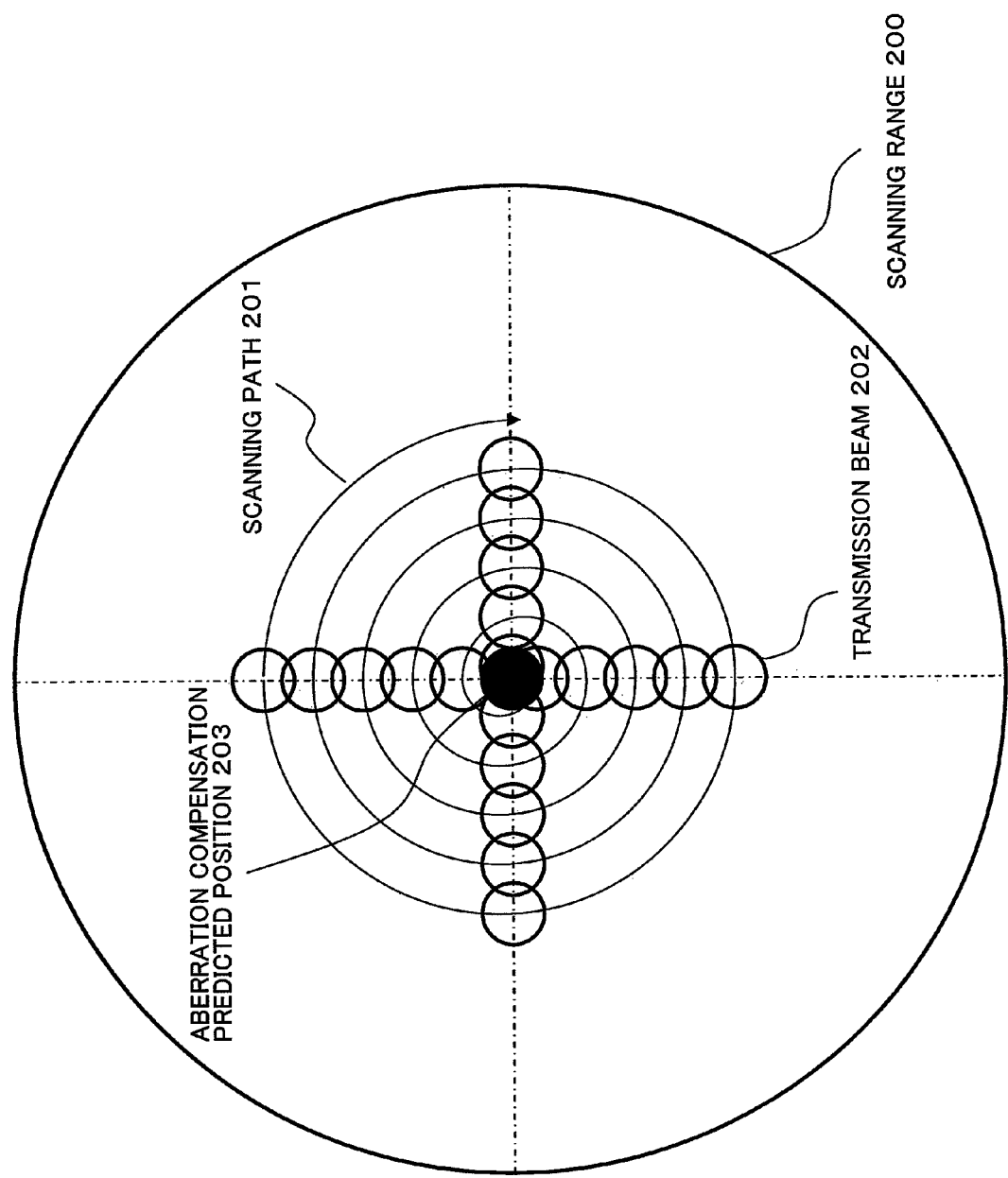
FIG. 5 is a figure of scanning paths of the transmission beam of the first exemplary embodiment of the present invention.

FIG. 5 is an example of scanning paths of the transmission beam according to the first exemplary embodiment.

The scanning path 201 shown in FIG. 5 indicates an example of the scanning path 201 which is centering on the predicted aberration compensation direction (the aberration compensation predicted position 203) as a center of the scanning range 200 and having scanned spirally to outside from the center. Further, in the spiral of FIG. 5, the reason of adopting the scanning path such as a transmission beam 202 being overlapped is that it is considering fluctuation of the transmission beam 202 due to vibration or the like of the capturing device 1, and overlapping is provided as a margin.

As the scanning path of the transmission beam, the capturing device 1 may adopt a spiral toward the center from the outer circumference on the contrary to the route of FIG. 5, or raster method which scans linearly, or the like.

However, when it uses the scanning path 201 shown in FIG. 5, in other words, the scanning path 201 which is centering on the predicted aberration compensation direction (the aberration compensation prediction position 203), and spirally scans toward the outer circumference from the center, the capturing device 1 can improve the possibility that the scanning operation until finding the partner becomes shorter.

The reason is because that the direction having the highest possibility that the partner exists in the initial state is the predicted aberration compensation direction and its neighboring area has also a high possibility that the partner exists. Therefore, the scanning path which starts from the aberration compensation direction and scans its neighboring area becomes the scanning path which can scan the position having a high possibility that the partner's device exists.

Further, according to the first exemplary embodiment, although it is described that the capturing controller 31 and the aberration controller 41 are different configurations for the sake of simplicity of explanation, it may be configured as one controller. In that case, the capturing device 1 may configure each block and operation contents of FIG. 1 such as the aberration switch 26 as a program of a computer.

Also, the capturing device 1 may be configured by at least three controllers in which the coarse capturing mechanism unit 11 and the fine capturing mechanism unit 12 are provided as separate controllers.

Next, a result of simulation of the first exemplary embodiment will be described.

Simulation of the capturing operation using two of the device X and the device Y shown in FIG. 4 was performed. As the simulation conditions, each defined that an angle of ±0.2 deg as a capturing range, 20 micro radian as a light diameter of the transmission beam, 20% as a margin for the light diameter, and a quadrant sensor as the capturing sensor 32. It also defined that 2 kHz as a detection band, and a spiral scan from the center for scanning. Under these conditions, simulation until completion of the capturing operation and transition to the tracking operation was performed, and it measured the capturing time. Further, the same conditions were applied to the device X and the device Y.

The result of simulation of three cases in this exemplary embodiment will be indicated in the next.

The first case is a case where it is supposed that the partner's device receives light always at the end of scanning operation, and this is the worst case that takes the longest time for the capturing operation. In this first case, it took about 95 seconds for the first scanning operation, about 48 seconds for the second scanning operation, and about 12 seconds for the third scanning operation, and it took about 159 seconds until completing the capturing operation.

The second case is a case where it is supposed that the partner's device exists in the capturing range by an equal probability, and the direction of the partner's device is distributed on the average. In this second case, as the average of 10 trials, it took about 47 seconds for the first scanning operation, about 22 seconds for the second scanning operation, and about 6 seconds for the third scanning operation, and it took about 78 seconds until completing the capturing operation.

The third case is a case where it is supposed that the partner's device is distributed along normal distribution (Gaussian distribution) of which the average is on the center of the capturing range, and this is a case close to the actual device. In this third case, as the average of 10 trials, it took about 24 seconds for the first scanning operation, about 12 seconds for the second scanning operation, and about 3 seconds for the third scanning operation, and it took about 40 seconds until completing the capturing operation.

Figure 10:
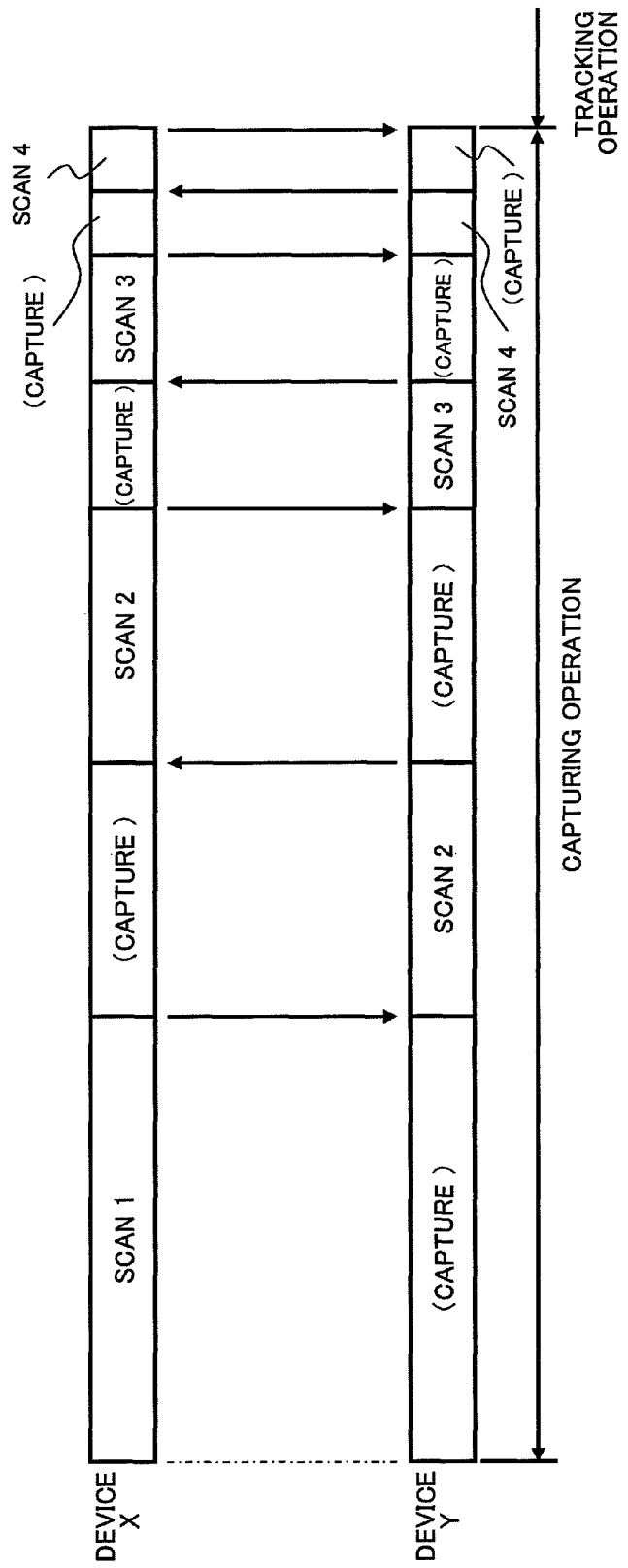
FIG. 10 is a second sequence diagram of capturing operation of a capturing device which is generally used.

On the other hand, when having measured the capturing time by the simulation for the case where the scanning operation and the capturing operation are performed alternately as shown in FIG. 10, it took about 222 seconds for the capturing time.

Based on the result of the above mentioned simulation, it has been indicated that the capturing operation of the capturing device 1 according to this exemplary embodiment can complete the capturing operation in a short time compared with the capturing operation as shown in FIG. 10.

Second Exemplary Embodiment

According to the first exemplary embodiment, although it has been described that the coarse capturing mechanism unit 11 was a configuration which changes the direction of the reception beam and the transmission beam directly, the coarse capturing mechanism unit may also be a configuration as a table device which is equipped with the fine capturing mechanism unit.

Figure 6:
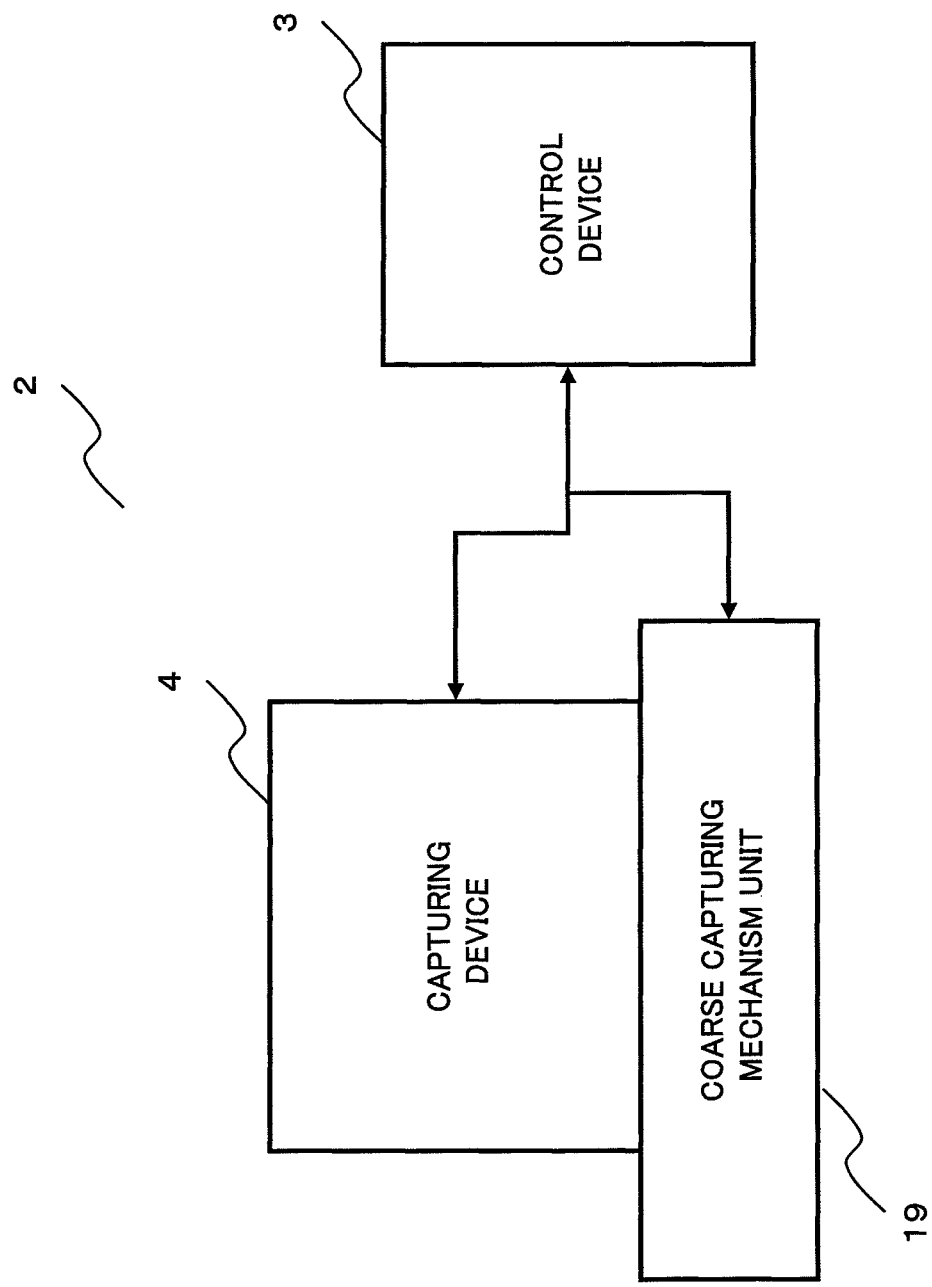
FIG. 6 is a block diagram showing a capturing system according to the second exemplary embodiment of the present invention.

FIG. 6 is a block diagram showing the entire structure of a capturing system 2 according to the second exemplary embodiment of the present invention. The capturing system 2 of this exemplary embodiment is constituted by including a control device 3 which controls the whole, a capturing device 4 which performs the fine capturing operation and the scanning operation and a coarse capturing mechanism unit 19 which is controlled by the control device 3 and performs the coarse capturing operation.

The control device 3 performs the same control as each controller of the first exemplary embodiment.

The coarse capturing mechanism unit 19 performs the program operation following instructions by the control device 3 and performs the coarse capturing operation and the coarse tracking operation for changing the direction of the capturing device 4 mounted on the coarse capturing mechanism unit 19. Because the coarse capturing mechanism unit 19 can be composed using a general-purpose two axial rotation table device or a gimbals device, the detailed description will be omitted.

Figure 7:
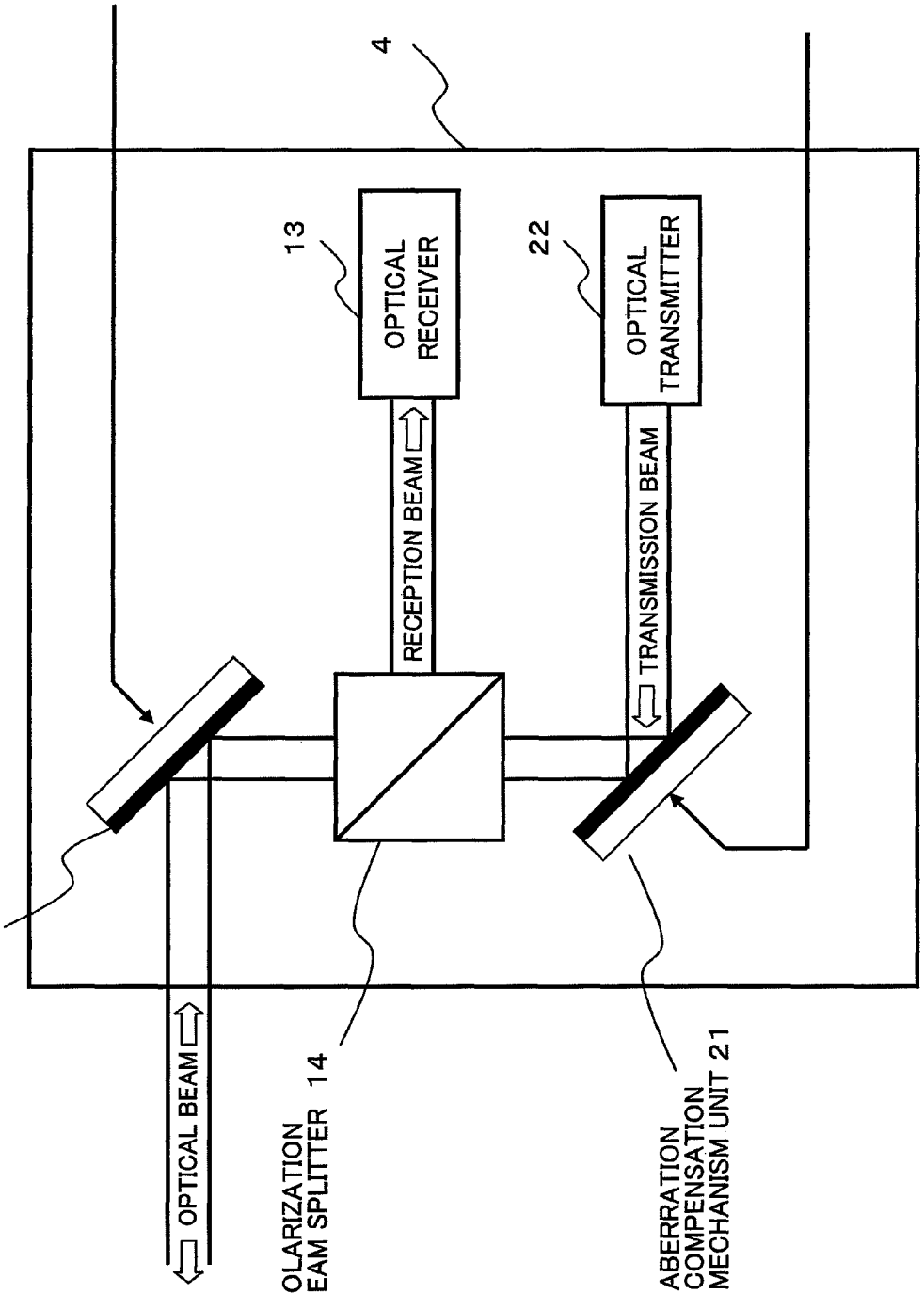
FIG. 7 is a block diagram showing a configuration of the second exemplary embodiment of the present invention.
Figure 8:
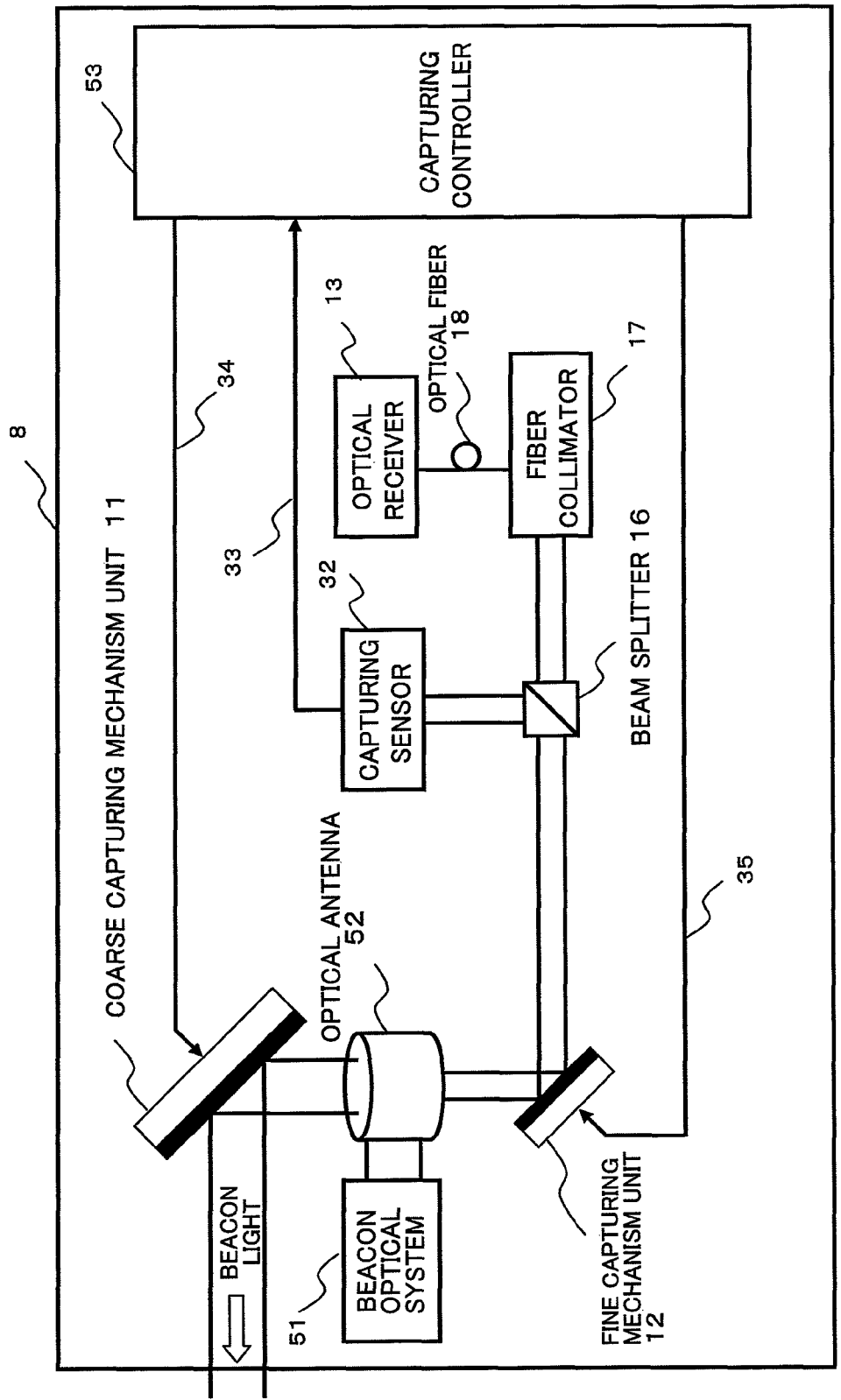
FIG. 8 is a block diagram showing a configuration of a capturing device which is generally used.
Figure 9:
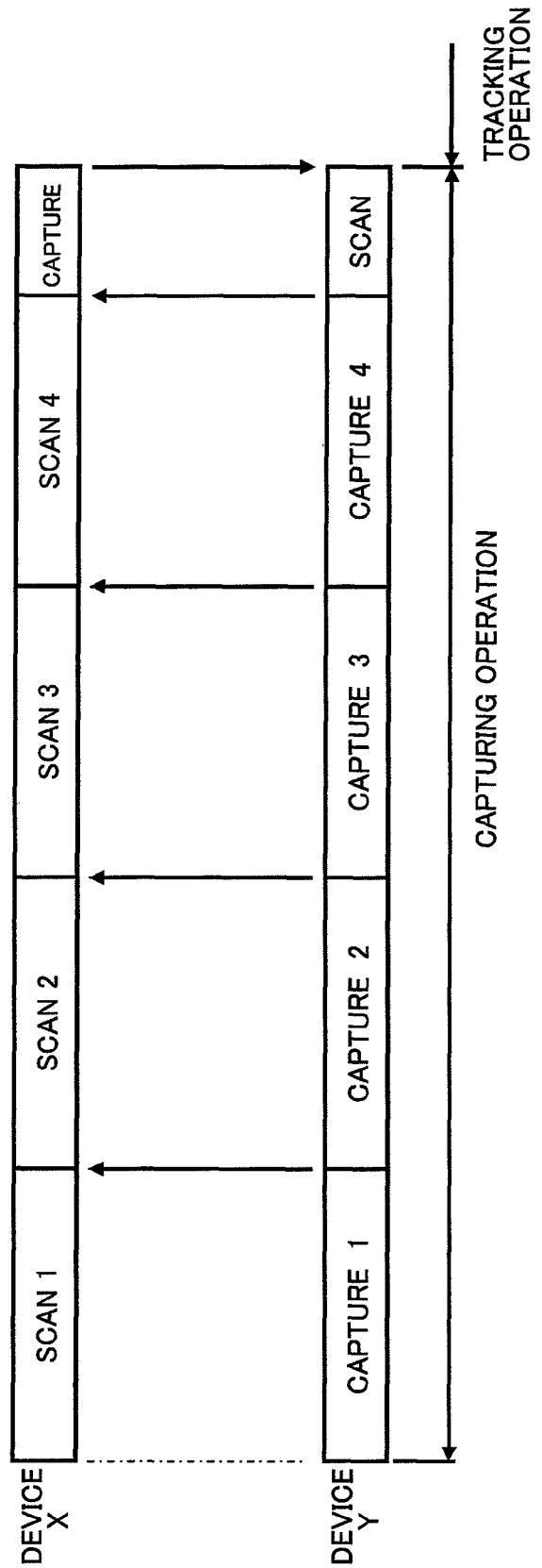
FIG. 9 is a first sequence diagram of capturing operation of a capturing device which is generally used.

FIG. 7 is a block diagram showing a configuration of the capturing device 4 of this exemplary embodiment. For the sake of convenience of a description, FIG. 7 is illustrating a main part. The capturing device 4 of FIG. 7 includes the fine capturing mechanism unit 12, the optical receiver 13, the polarization beam splitter 14, the aberration compensation mechanism unit 21, and the optical transmitter 22.

In the capturing device 4 of this exemplary embodiment, the coarse capturing operation or the like using the program operation is performed, with using the control device 3 and the coarse capturing mechanism unit 19. Therefore, as the capturing device 4, it performs the directivity operation and the fine tracking operation performed by the fine capturing mechanism unit 12 and the optical receiver 13, and the scanning operation and the aberration compensation operation performed by the aberration compensation mechanism unit 21 and the optical transmitter 22. Further, the capturing device 4 can also obtain an approximate identical optical axis for the reception beam and the transmission beam using the polarization beam splitter 14 as an optical circulator.

By using such a configuration, the capturing device 4 used for a long-distance optical communication can obtain the effect for speeding up the capturing operation without using beacon light.

The reason is because that it has been arranged so that it may provide the fine capturing mechanism unit 12 and the optical receiver 13 for performing the capturing operation, and the aberration compensation mechanism unit 21 and the optical transmitter 22 for performing the scanning operation, and as a result, the capturing operation and the scanning operation can be performed in parallel and concurrently.

Also, it is because it can obtain an approximate identical optical axis for the transmission beam and the reception beam using the polarization beam splitter 14 in order to reduce deviation between the transmission beam and the reception beam.

Further, the capturing device 4 can also obtain the effect for speeding up the coarse capturing operation performed in the coarse capturing mechanism unit 19.

The reason is because that it has been configured so that the control device 3 may be a separate device from the capturing device 4, and as a result, the capturing device 4 becomes a device to be moved by the coarse capturing mechanism unit 19.

Third Exemplary Embodiment

The first exemplary embodiment has described the scanning operation using the aberration compensation mechanism unit 21. However, it is enough for the scanning operation that it can scan the transmission beam, and the scanning operation can be realized by using other configurations.

Further, as the scanning path of the transmission beam, the first exemplary embodiment has described the path having a spiral shape from a center or an outer circumference. However, the capturing device 1 can use different paths as the scanning paths as it has been already described.

Figure 11:
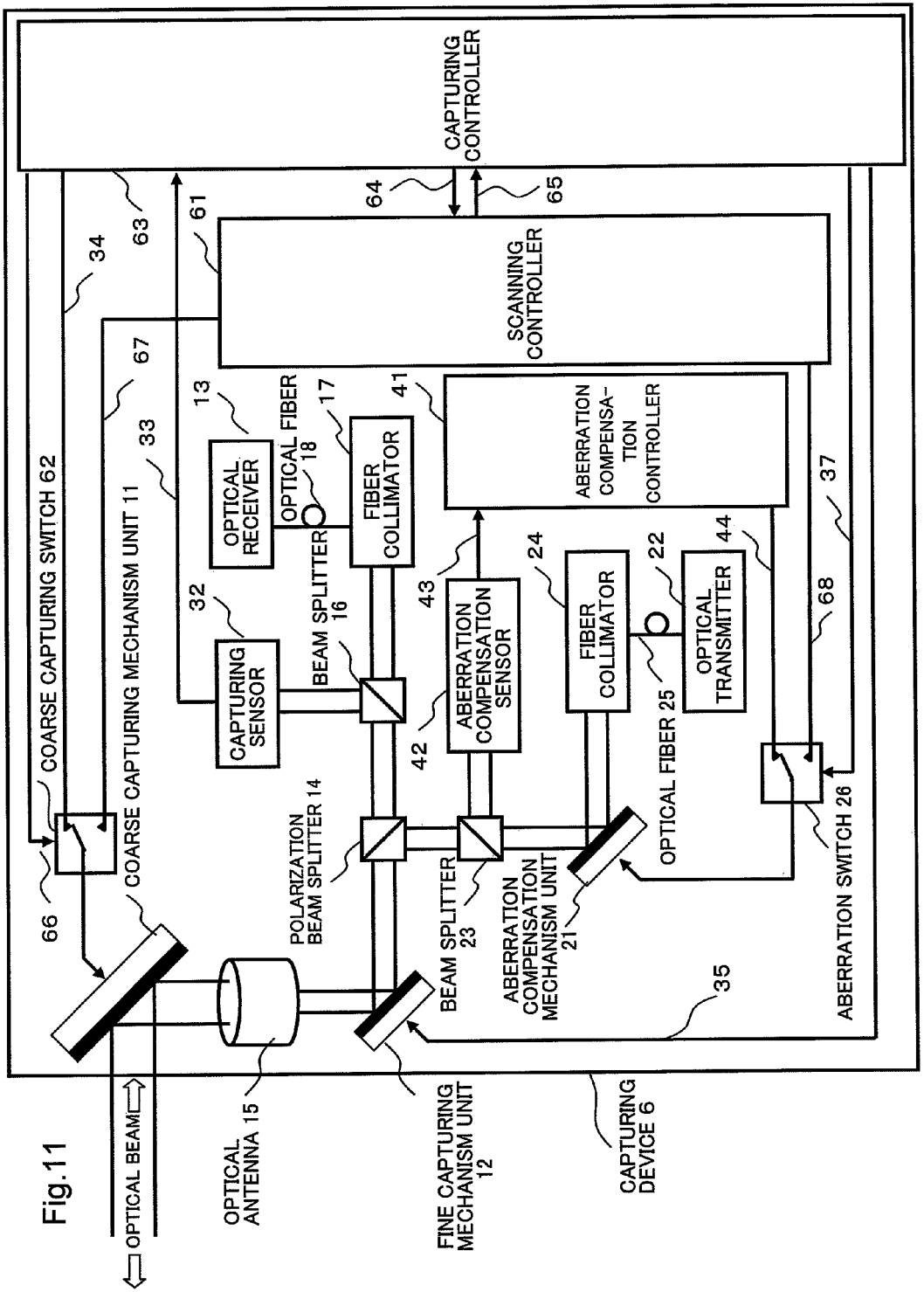
FIG. 11 is a block diagram showing a configuration of the third exemplary embodiment of the present invention.

FIG. 11 is a block diagram showing a configuration of a capturing device 6 according to the third exemplary embodiment of the present invention.

The capturing device 6 according to the third exemplary embodiment performs the scanning operation using the coarse capturing mechanism unit 11 in addition to the aberration compensation mechanism unit 21. Therefore, the capturing device 6 includes a scanning controller 61 and a coarse capturing switch 62, and is different from the capturing device 1 according to the first exemplary embodiment in a point that the scanning operation is realized using these configurations and the capturing controller 63 or the like.

Accordingly, in below, configurations and operations related to the scanning operation of the capturing device 6 according to the third exemplary embodiment will be described in detail with reference to drawings, and detailed description about the similar configurations and operations to the first exemplary embodiment are omitted. Further, in FIG. 11, the same numbers are attached to the same configurations as FIG. 1.

The capturing controller 63 performs the similar operations to the capturing controller 31 according to the first exemplary embodiment. Further, the capturing controller 63 controls the scanning operation performed by the scanning controller 61 using a scanning controller control signal 64, and receives scanning operation information 65 which indicates the state of the scanning operation from the scanning controller 61. And the capturing controller 63 also controls the coarse capturing switch 62 using a coarse capturing switching control signal 66. However, as it will be described later, it is not necessary for the capturing controller 63 to output a signal which is corresponding to the scanning signal 36 according to the first exemplary embodiment for controlling the aberration compensation mechanism unit 21, because the scanning controller 61 controls the scanning operation using the aberration compensation mechanism unit 21.

The scanning controller 61 receives the scanning controller control signal 64 from the capturing controller 63, and controls the scanning operation. Specifically, the scanning controller 61 controls the scanning operation (hereinafter, referred to as coarse scanning operation) of the coarse capturing mechanism unit 11 using a coarse scanning control signal 67, and the scanning operation (hereinafter, referred to as fine scanning operation) of the aberration compensation mechanism unit 21 using a fine scanning control signal 68. Further, the scanning controller 61 sends out the scanning operation information 65 representing the state of the scanning operation to the capturing controller 63.

The aberration switch 26 is, similar to the aberration switch 26 of the capturing device 1 according to the first exemplary embodiment, controlled by the capturing controller 63 and sends the control signal to the aberration compensation mechanism unit 21. Although the inputted control signal is also similar to the aberration switch 26 according to the first exemplary embodiment, the aberration switch 26 is different from the first exemplary embodiment in a point that it receives the fine scanning control signal 68 used for the scanning operation from the scanning controller 61.

The aberration compensation mechanism unit 21 performs the aberration compensation operation similar to the aberration compensation mechanism unit 21 according to the first exemplary embodiment and the fine scanning operation which will be described in detail later based on the control signal received from the aberration switch 26.

The coarse capturing switch 62 is controlled based on the coarse capturing switching control signal 66 from the capturing controller 63, and sends out either the coarse scanning control signal 67 from the scanning controller 61 or the coarse capturing control signal 34 from the capturing controller 63 to the coarse capturing mechanism unit 11.

The coarse capturing mechanism unit 11 performs the similar capturing operation to the coarse capturing mechanism unit 11 according to the first exemplary embodiment when it has received the coarse capturing control signal 34 from the coarse capturing switch 62, and performs the coarse scanning operation which will be described, in detail later when it has received the coarse scanning control signal 67.

Next, the scanning operation of the capturing device 6 according to the third exemplary embodiment will be described.

First, for starting of scanning operation, the capturing controller 63 sets the coarse capturing switch 62 using the coarse capturing switching control signal 66 so that the coarse scanning control signal 67 outputted by the scanning controller 61 may input to the coarse capturing mechanism unit 11. Further, the capturing controller 63 sets the aberration switch 26 using the switching control signal 37 so that the fine scanning control signal 68 outputted by the scanning controller 61 may input to the aberration compensation mechanism unit 21. After setting of each switch, the capturing controller 63 performs the control including starting instruction and ending instruction of the scanning operation to be performed by the scanning controller 61 using the scanning controller control signal 64.

The scanning controller 61, which has received instructions used by the scanning controller control signal 64, controls the coarse capturing mechanism unit 11 using the coarse scanning control signal 67, and the aberration compensation mechanism unit 21 using the fine scanning control signal 68, and performs the scanning operation using the transmission beam from the optical transmitter 22. Based on such configurations, the capturing device 6 according to the third exemplary embodiment is arranged so that it can perform two kinds of scanning operation, the coarse scanning operation and the fine scanning operation, using two of mechanism units.

Further, the capturing device 6 according to the third exemplary embodiment is also performing the capturing operation while performing the scanning operation, similar to the capturing device 1 according to the first exemplary embodiment. However, in the capturing device 6, the coarse scanning operation using the coarse capturing mechanism unit 11 is performed. In other words, there is a possibility that the coarse scanning operation using the coarse capturing mechanism unit 11 may be performed during the capturing operation of the fine capturing mechanism unit 12. Therefore, in the capturing device 6, the capturing controller 63 receives the scanning operation information 65 which indicates the state of the scanning operation from the scanning controller 61, and it controls the directivity operation of the fine capturing mechanism unit 12 using the fine capturing control signal 35 so as not to be affected by the coarse scanning operation. As this control, for example, the capturing controller 63 performs the control such as stopping the capturing operation during the coarse scanning operation, and controls the capturing operation by performing the directivity operation on the compensated direction that was changed in the coarse scanning operation after completion of the coarse scanning operation.

A scanning path of the transmission beam according to the third exemplary embodiment will be described with reference to FIG. 12.

Figure 12:
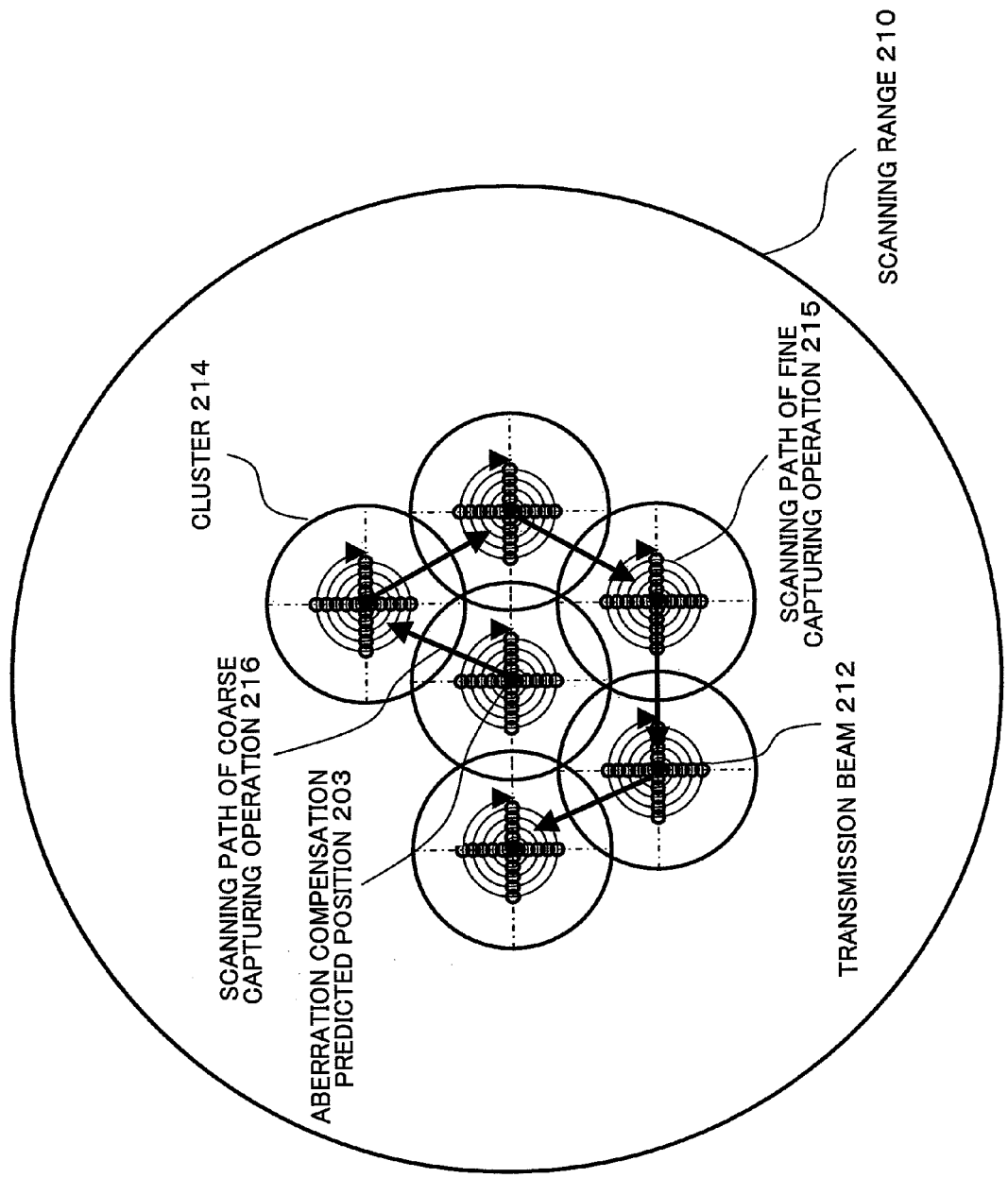
FIG. 12 is a figure showing a scanning path of a transmission beam of the third exemplary embodiment of the present invention.

FIG. 12 is an example of a scanning path of the transmission beam according to the third exemplary embodiment.

The scanning path shown in FIG. 12 indicates an example of the scanning path which is centering the predicted aberration compensation direction (the aberration compensation predicted position 203) of the partner's device obtained from the database described in the first exemplary embodiment as a center of the scanning range, and is scanning approximately spirally to outside from its center. However, the scanning path may begin to start scanning operation from a position which is different from the center of the scanning range.

Further, the scanning path of FIG. 12 is dividing the scanning range 210 into a plurality of areas (hereinafter, referred to as a cluster 214). The scanning controller 61 uses the coarse scanning operation using the coarse capturing mechanism unit 11 for movement of the transmission beam 212 between the clusters 214, and uses the fine scanning operation using the aberration compensation mechanism unit 21 for the scanning operation in the cluster 214. However, it is for the sake of convenience of a description that configurations for realizing the coarse scanning operation and the fine scanning operation are separated like this, and needless to say, it may configure without separating functions of the coarse capturing mechanism unit 11 and the aberration compensation mechanism unit 21 and may perform the coarse scanning operation and the fine scanning operation as a coordinated unit.

First, the scanning controller 61 aligns the transmission beam 212 on the center of the central cluster, that is the predicted direction of the aberration compensation, based on the coarse scanning operation using the coarse capturing mechanism unit 11, and fixes the coarse capturing mechanism unit 11 with its direction. Next, the scanning controller 61 performs the fine scanning operation (scanning path 215) in a central cluster spirally from the center of the cluster to the outside using the aberration compensation mechanism unit 21.

When the fine scanning operation in the central cluster is completed, the scanning controller 61 performs the scanning operation in a cluster neighboring outside the central cluster. Therefore, the scanning controller 61 performs the coarse scanning operation (scanning path 216) using the coarse capturing mechanism unit 11, moves the transmission beam from the central cluster to the neighboring cluster, and fixes the direction of the coarse capturing mechanism unit 11 on the center direction of the cluster. Then, the scanning controller 61 performs, similarly to the central cluster, the fine scanning operation (scanning path 215) in the cluster spirally from the center of the cluster to the outside using the aberration compensation mechanism unit 21. When the scanning operation in that cluster is completed, the scanning controller 61 performs the scanning operation of the next cluster neighboring the central cluster. When the scanning operation in the clusters neighboring the central cluster is completed, the scanning controller 61 performs the scanning operation in further outside clusters.

Thus, the scanning controller 61 performs the scanning operation by repeating the coarse scanning operation which moves approximately spirally among clusters from the central cluster to the outside cluster and the fine scanning operation in the cluster.

Further, there is a possibility that displacement of the scanning direction may occur due to relative movement of own device performing the scanning operation and the partner's device. Therefore, in the capturing device 6 according to the third exemplary embodiment, the scanning controller 61 receives information about this displacement, and is performing compensation in the scanning operation. The capturing controller 63 notifies the scanning controller 61 of the information about this displacement using the scanning controller control signal 64 based on the capturing sensor signal 33 from the capturing sensor 32. However, in order to know this displacement, it is not necessarily to configure that the scanning controller 61 receives the information from the capturing controller 63. For example, it can arrange so that the scanning controller 61 may directly receive the capturing sensor signal 33 of the capturing sensor 32.

The scanning controller 61 which has received the information about displacement performs the fine scanning operation in which displacement in the relative position between devices is to be compensated using the aberration compensation mechanism unit 21. Further, in the next coarse scanning operation, the scanning controller 61 fixes the coarse capturing mechanism unit 11 on the direction which has been considered the compensation performed in the aberration compensation mechanism unit 21 with respect to the center of the cluster after movement. As a result, in the fine scanning operation following the coarse scanning operation, the aberration compensation mechanism unit 21 can perform the fine scanning operation with respect to the center of which the displacement has been compensated. Thus, the capturing device 6 according to the third exemplary embodiment can perform the scanning operation in consideration of displacement based on relative movement between devices.

And, as the scanning path of the transmission beam, it is not necessarily to be a route described in FIG. 12. For example, the capturing device 6 may adopt a spiral toward the center from the outer circumference on the contrary to the route of FIG. 12, or raster method which scans linearly. Further, in the capturing device 6, it may provide different shape of routes for a route of the coarse scanning operation and a route of the fine scanning operation. For example, in the capturing device 6, it may provide raster method for the route of the coarse scanning operation and a spiral for the route of the fine scanning operation.

Figure 13:
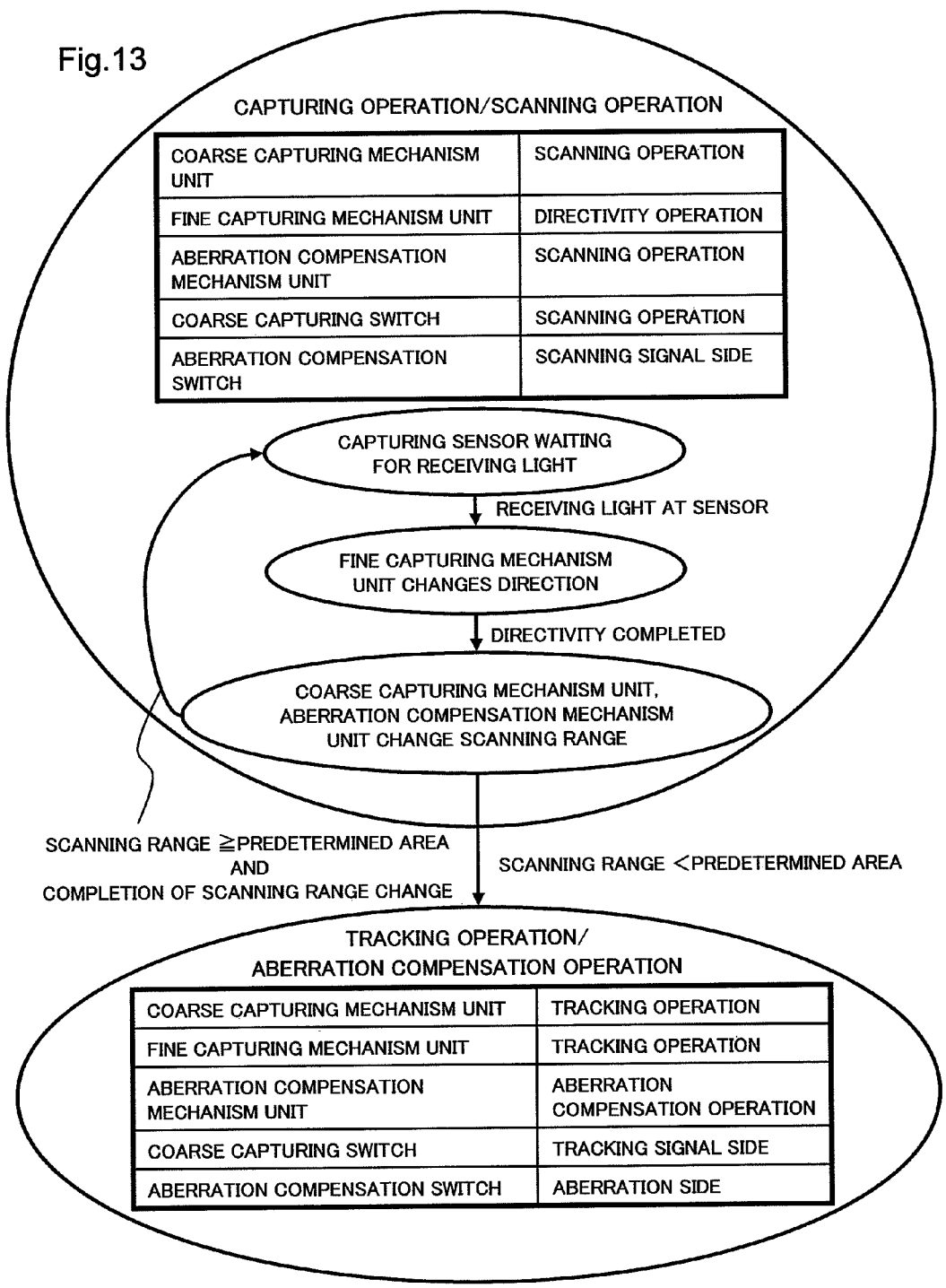
FIG. 13 is a state transition diagram of operation of the third exemplary embodiment of the present invention.

FIG. 13 is a state transition diagram which summarizes the operation states of the capturing device 6 according to the third exemplary embodiment.

In FIG. 13, it is different from the state transition diagram (FIG. 3) according to the first exemplary embodiment in the points that a field of the coarse capturing switch 62 is added to each table, the operation of the coarse capturing mechanism unit 11 at the time of capturing operation/scanning operation is the scanning operation, and the coarse capturing mechanism unit 11 is added to change of a scanning range. This is because, in the capturing device 6 according to the third exemplary embodiment, it has been arranged so that the coarse capturing mechanism unit 11 performs the coarse scanning operation.

Further, in the capturing device 6 according to the third exemplary embodiment, it describes that the capturing controller 63 and the scanning controller 61 and the aberration controller 41 are different configurations for the sake of convenience of explanation, however, two of these or all may be configured as one controller.

Further, in the capturing device 6 according to the third exemplary embodiment, the reason of arranging the configuration by which the scanning controller 61 outputs the fine scanning control signal 68 which controls the aberration compensation mechanism unit 21 is because to control the scanning operation unitarily. Accordingly, as far as information can be exchanged between controllers, the scanning controller 61 does not necessarily have to control both of the fine scanning operation and the coarse scanning operation. For example, similar to the capturing device 1 according to the first exemplary embodiment, the capturing controller 63 may send out a control signal of the fine scanning operation. Further, the capturing device 6 may be configured by at least four controllers so that a separate controller may control a fine scanning control signal 68.

Further, when several controllers are grouped together, the capturing device 6 may configure each block and operation contents of switches of FIG. 11 such as the aberration switch 26, the coarse capturing switch 62 or the like as a program of a computer which is included in the controller but not illustrated.

Further, in the capturing device 6 according to the third exemplary embodiment, it has described that both of the fine scanning operation using the aberration compensation mechanism unit 21 and the coarse scanning operation using the coarse capturing mechanism unit 11 were performed together, however, it does not always need to perform both of the scanning operations, but it may perform only one of the scanning operations.

For example, in case of a communication between devices from which the direction does not always change greatly, the capturing device 6 performs the fine scanning operation which is centering on the present direction first. And, in a case where the partner's device cannot be detected only by the fine scanning operation, the capturing device 6 may perform the scanning operation combining the coarse scanning operation and the fine capturing operation together.

Thus, the capturing device 6 according to the third exemplary embodiment which is configured like this can obtain the effect that can narrow a movable range in the scanning operation using the aberration compensation mechanism unit 21 in addition to the effect of the capturing device 1 according to the first exemplary embodiment.

The reason is because that with respect to large scanning operation in the scanning range, the coarse scanning operation using the coarse capturing mechanism unit 11 is performed, and the aberration compensation mechanism unit 21 may realize the scanning operation only in the range of each cluster.

Further, the capturing device 6 according to the third exemplary embodiment can obtain the effect that it can realize the scanning operation appropriate for displacement between devices during the scanning operation.

The reason is because that it has been arranged so that it may compensates displacement of the scanning direction, that occurred due to relative movement with the partner's device during the scanning operation, by use of the fine scanning operation using the aberration compensation mechanism unit 21, and in the next coarse operation, the coarse capturing mechanism unit 11 may be fixed on the direction in consideration of the compensation.

Further, the capturing device 6 according to the third exemplary embodiment can obtain the effect that it can perform the coarse scanning operation without changing the coarse capturing mechanism unit 11.

The reason is because that it has been arranged so that the aberration compensation mechanism unit 21 may perform the fine scanning operation and the coarse capturing mechanism unit 11 may be fixed on the central direction of each cluster in the scanning operation, and as a result, a new angle detector with high accuracy is not needed for the coarse capturing mechanism unit 11 for the scanning operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-167627, filed on Jul. 16, 2009 and No. 2009-289435, filed on December 21 And 2009, the disclosure of which is incorporated herein in its entirety by reference.

The invention claimed is:

1. A capturing device comprising:
   an optical receiver configured to receive a beam from outside, as a reception beam;
   a reception beam capturing unit adapted to perform a capturing operation to introduce the reception beam to the optical receiver;
   an optical transmitter configured to generate a transmission beam to transmit to outside;
   a transmission beam scanning unit configured to perform a scanning operation of the transmission beams; and
   an optical circulator in which the same terminal is used for incidence of the reception beam and exit of the transmission beam;
   wherein the transmission beam scanning unit comprises:
   a capture controller configured to control a coarse scanning unit and a fine scanning unit by at least a first signal, a second signal, a third signal and a fourth signal;
   the coarse scanning unit configured to be controlled by the first signal from the capture controller to perform a part of the scanning operation by moving the transmission beam through a predetermined angle; and
   the fine scanning unit configured to be controlled by the second signal from the capture controller to perform another part of the scanning operation by moving the transmission beam through an angle narrower than the predetermined angle,
   wherein the fine scanning unit is further configured to be controlled by the third signal from the capture controller to scan the transmission beam in accordance with a predetermined scanning path which is an overlapped spiral path which spirals from the center of a scanning range to an outside of the scanning range, and
   the fine scanning unit is further configured to be controlled by the fourth signal from the capture controller to scan the transmission beam in accordance with the predetermined scanning path which is the overlapped spiral path from the center of the scanning range to the outside of the scanning range such that at least one of a plurality of overlapped portions of the overlapped spiral path is a cluster of a finer overlapped spiral path within the scanning range from the center of the cluster to an outside of the cluster.

2. The capturing device according to claim 1, wherein the transmission beam scanning unit is further configured to perform the scanning operation of the transmission beam at least partly concurrently with the capturing the reception beam.

3. The capturing device according to claim 1, wherein the transmission beam scanning unit is further configured to perform an aberration compensation operation with respect to the transmission beam.

4. The capturing device according to claim 3, wherein the aberration compensation operation is performed based on a difference between:
   the direction of aberration with respect to an optical axis of the reception beam, and
   the direction of the optical axis of the transmission beam.

5. The capturing device according to claim 1, wherein the optical axis of the transmission beam, at the same terminal in the optical circulator, is within one of larger angles between the aberration and the maximum scanning angle to the optical axis of the reception beam.

6. The capturing device according to claim 1, wherein a movable range of the transmission beam scanning unit is at least as wide as a movable range of the reception beam fine capturing unit.

7. The capturing device according to claim 1, wherein the fine scanning unit and the coarse scanning unit are further configured to scan the transmission beam according to respectively different scanning paths.

8. The capturing device of claim 1, wherein said reception beam capturing unit comprises:
   a reception beam coarse capturing unit; and
   a reception beam fine capturing unit configured to operate at a higher speed than the reception beam coarse capturing unit.

9. A capturing method, comprising:
   capturing a beam from outside, as a reception beam; and
   performing a scanning operation independently from the capturing step for transmitting a transmission beam to the outside;
   wherein said scanning operation comprises:
      controlling, by a first signal from a capture controller, performance of a part of the scanning operation by moving a transmission beam through a predetermined angle;
      controlling, by a second signal from the capture controller, performance of another part of the scanning operation by moving the transmission beam through an angle narrower than the predetermined angle; and
      controlling, by a third signal from the capture controller, scanning the transmission beam in accordance with a predetermined scanning path which is an overlapped spiral path which spirals from the center of a scanning range to an outside of the scanning range, and
   controlling, by a fourth signal from the capture controller, scanning the transmission beam in accordance with the predetermined scanning path which is the overlapped spiral path from the center of the scanning range to the outside of the scanning range such that at least one of a plurality of overlapped portions of the overlapped spiral path is a cluster of a finer overlapped spiral path within the scanning range from the center of the cluster to an outside of the cluster.

10. A non-transitory computer readable medium embodying a program, said program causing a capturing device to perform a method, said method comprising:
    capturing a beam from outside, as a reception beam; and
    performing a scanning operation independently from the capturing step for transmitting a transmission beam to the outside;
    wherein said scanning operation comprises:
       controlling, by a first signal from a capture controller, performance of a part of the scanning operation by moving a transmission beam through a predetermined angle;
       controlling, by a second signal from the capture controller, performance of another part of the scanning operation by moving the transmission beam through an angle narrower than the predetermined angle; and
       controlling, by a third signal from the capture controller, scanning the transmission beam in accordance with a predetermined scanning path which is an overlapped spiral path which spirals from the center of a scanning range to an outside of the scanning range, and
    controlling, by a fourth signal from the capture controller, scanning the transmission beam in accordance with the predetermined scanning path which is the overlapped spiral path from the center of the scanning range to the outside of the scanning range such that at least one of a plurality of overlapped portions of the overlapped spiral path is a cluster of a finer overlapped spiral path within the scanning range from the center of the cluster to an outside of the cluster.

11. A capturing device comprising:
    optical receiving means for receiving a beam from outside, as a reception beam;
    reception beam capturing means for performing capturing operation which introduces the reception beam to the optical receiver;
    optical transmitting means for generating a transmission beam to transmit to outside;
    transmission beam scanning means for performing a scanning operation of the transmission beams; and
    optical circulator in which the same terminal is used for incidence of the reception beam and exit of the transmission beam;
    wherein the transmission beam scanning unit comprises:
       a capture controller configured to control a coarse scanning unit and a fine scanning unit by at least a first signal, a second signal, a third signal and a fourth signal;
       the coarse scanning means configured to be controlled by the first signal from the capture controller to perform a part of the scanning operation by moving the transmission beam through a predetermined angle; and
       the fine scanning means configured to be controlled by the second signal from the capture controller to perform another part of the scanning operation by moving the transmission beam through an angle narrower than the predetermined angle,
    wherein the fine scanning means is further configured to be controlled by the third signal from the capture controller to scan the transmission beam in accordance with a predetermined scanning path which is an overlapped spiral path which spirals from the center of a scanning range to an outside of the scanning range, and
    the fine scanning means is further configured to be controlled by the fourth signal from the capture controller to scan the transmission beam in accordance with the predetermined scanning path which is the overlapped spiral path from the center of the scanning range to the outside of the scanning range such that at least one of a plurality of overlapped portions of the overlapped spiral path is a cluster of a finer overlapped spiral path within the scanning range from the center of the cluster to an outside of the cluster.

\* \* \* \* \*